US011879995B2

(12) United States Patent
Hudlemeyer et al.

(10) Patent No.: US 11,879,995 B2
(45) Date of Patent: *Jan. 23, 2024

(54) LASER TRACKER CALIBRATION SYSTEM AND METHODS

(71) Applicant: BRUNSON INSTRUMENT COMPANY, Kansas City, MO (US)

(72) Inventors: Aaron A. Hudlemeyer, Peculiar, MO (US); Mark J. Meuret, Overland Park, KS (US)

(73) Assignee: BRUNSON INSTRUMENT COMPANY, Kansas City, MO (US)

( * ) Notice: Subject to any disclaimer, the term of this patent is extended or adjusted under 35 U.S.C. 154(b) by 509 days.

This patent is subject to a terminal disclaimer.

(21) Appl. No.: 16/940,298

(22) Filed: Jul. 27, 2020

(65) Prior Publication Data

US 2020/0355797 A1 Nov. 12, 2020

Related U.S. Application Data

(63) Continuation-in-part of application No. 16/112,299, filed on Aug. 24, 2018, now Pat. No. 10,725,493, and
(Continued)

(51) Int. Cl.
*G01S 7/48* (2006.01)
*G01S 7/481* (2006.01)
(Continued)

(52) U.S. Cl.
CPC .......... *G01S 7/4813* (2013.01); *G01S 17/87* (2013.01); *F16M 11/08* (2013.01); *F16M 11/10* (2013.01)

(58) Field of Classification Search
CPC ....... G01S 7/4813; G01S 17/87; F16M 11/08; F16M 11/10
See application file for complete search history.

(56) References Cited

U.S. PATENT DOCUMENTS

| 5,430,948 A | 7/1995 | Vander Wal, III |
| 6,019,332 A | 2/2000 | Sweere et al. |

(Continued)

FOREIGN PATENT DOCUMENTS

| EP | 3167517 A1 | 5/2017 |
| WO | 2016007918 A1 | 1/2016 |

OTHER PUBLICATIONS

"Communication under Rule 71(3) EPC received for EP Patent Application Serial No. 15818321.0 dated Jun. 28, 2021."
(Continued)

*Primary Examiner* — Kevin K Pyo
(74) *Attorney, Agent, or Firm* — Kutak Rock LLP; Brian L. Main

(57) ABSTRACT

A system and method of calibrating a laser tracker is provided. The system includes a support system for quickly and easily moving an artifact to a desired position and orientation and for holding the artifact in the position and orientation. An adjustable alignment mirror is coupled to a first end of the artifact so that the more accurate ranging system of the laser tracker can be isolated to determine a reference length of the artifact. Additional measurements are then taken to exercise one or more error source within the tracker. The support system includes a positioner and a support beam for positioning and supporting the artifact. The artifact is coupled to the support beam using kinematic clamps that are designed to reduce or eliminate errors associated with over-constraining the artifact.

20 Claims, 25 Drawing Sheets

Related U.S. Application Data a continuation-in-part of application No. 15/437,127, filed on Feb. 20, 2017, now Pat. No. 10,739,449, which is a continuation of application No. 14/796,683, filed on Jul. 10, 2015, now Pat. No. 9,575,163.

(60) Provisional application No. 62/549,504, filed on Aug. 24, 2017, provisional application No. 62/022,917, filed on Jul. 10, 2014.

(51) Int. Cl.
*G01S 17/87* (2020.01)
*F16M 11/08* (2006.01)
*F16M 11/10* (2006.01)

(56) References Cited

U.S. PATENT DOCUMENTS

| | | | |
|---|---|---|---|
| 7,277,811 | B1 | 10/2007 | Marsh et al. |
| 8,051,575 | B2 | 11/2011 | Bridges et al. |
| 8,141,264 | B2 | 3/2012 | Brunson |
| 9,575,163 | B2 | 2/2017 | Hudlemeyer et al. |
| 10,739,449 | B2 | 8/2020 | Hudlemeyer et al. |
| 2002/0148133 | A1 | 10/2002 | Bridges et al. |
| 2009/0177438 | A1 | 7/2009 | Raab |
| 2011/0088271 | A1 | 4/2011 | Bridges |
| 2012/0262698 | A1 | 10/2012 | Day et al. |
| 2015/0379714 | A1 | 12/2015 | Cramer |
| 2016/0011303 | A1 | 1/2016 | Hudlemeyer et al. |
| 2017/0160384 | A1 | 6/2017 | Hudlemeyer et al. |
| 2017/0199025 | A1* | 7/2017 | Bridges ............... G01B 21/042 |

OTHER PUBLICATIONS

"Communication Pursuant to Article 94(3) EPC Received for European Patent Office Application No. 15818321.0, dated Mar. 5, 2020, 4 pages."

"Communication pursuant to Rules 70(2) and 70a(2) EPC received for EP Application No. 15818321.0 dated Mar. 9, 2018", 1.

"Extended European Search Report Received for European Appolication No. 15818321.0, dated Feb. 21, 2018, 9 Pages.", 9 Pages.

"Final Office Action Received for U.S. Application No. 15/437, 127, dated Dec. 17, 2019, 17 Pages".

"International Preliminary Report on Patentability received for PCT Application Serial No. PCT/US2015/040043 dated Jan. 19, 2017, 6 pages.", 6 pages.

"International Search Report and Written Opinion received for PCT Application No. PCT/US2015/040043, dated Oct. 27, 2015."

"Non Final Office Action Received for U.S. Appl. No. 15/437,127, dated Nov. 1, 2018, 10 Pages".

"Non Final Office Action Received for U.S. Appl. No. 15/437,127, dated May 14, 2019, 8 Pages".

"Notice of Allowance Received for U.S. Appl. No. 15/437,127, dated Mar. 24, 2020, 7 pages".

"Notice of Allowance, for U.S. Appl. No. 14/796,683, 8 Pages".

* cited by examiner

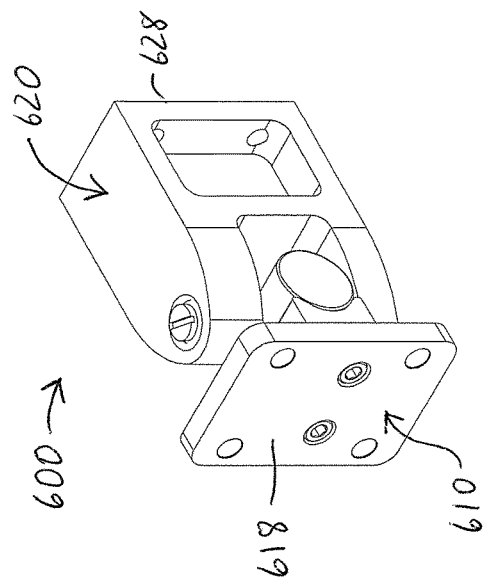
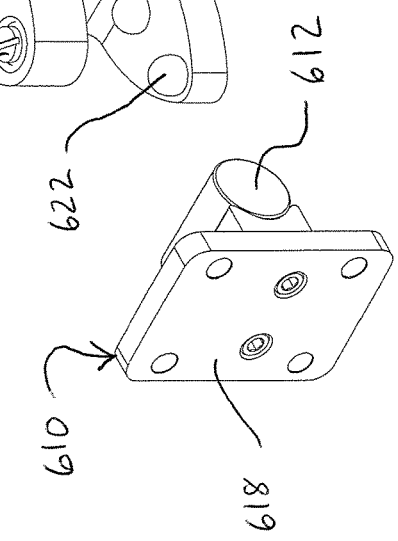
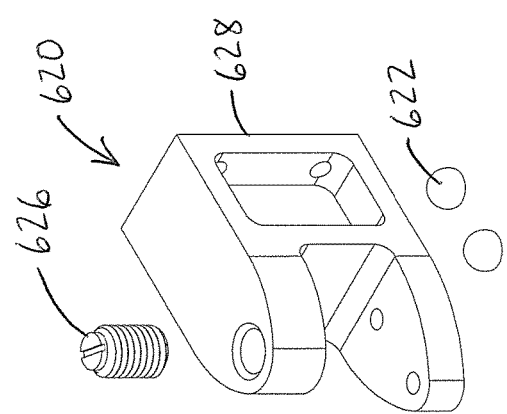
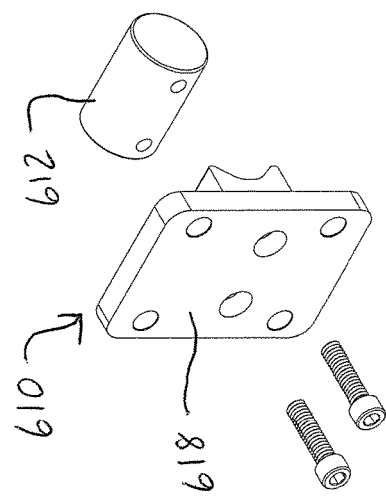
FIG. 7A
FIG. 7B
FIG. 7C

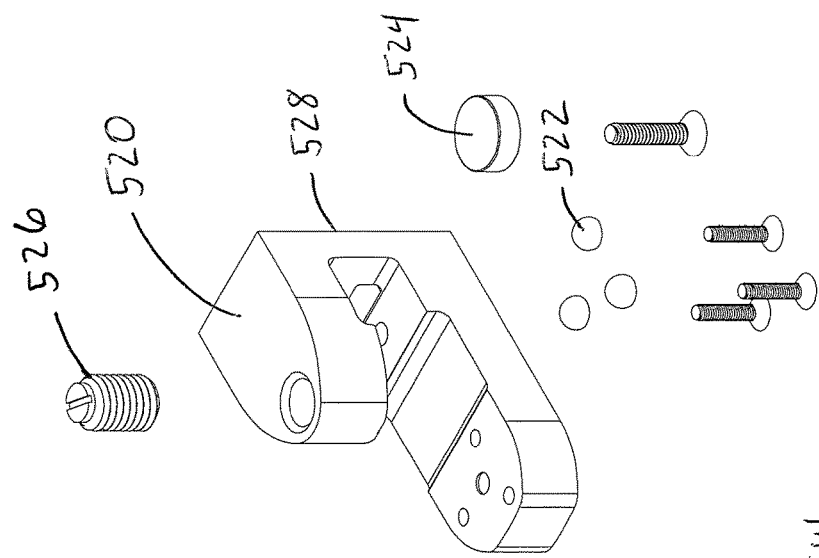
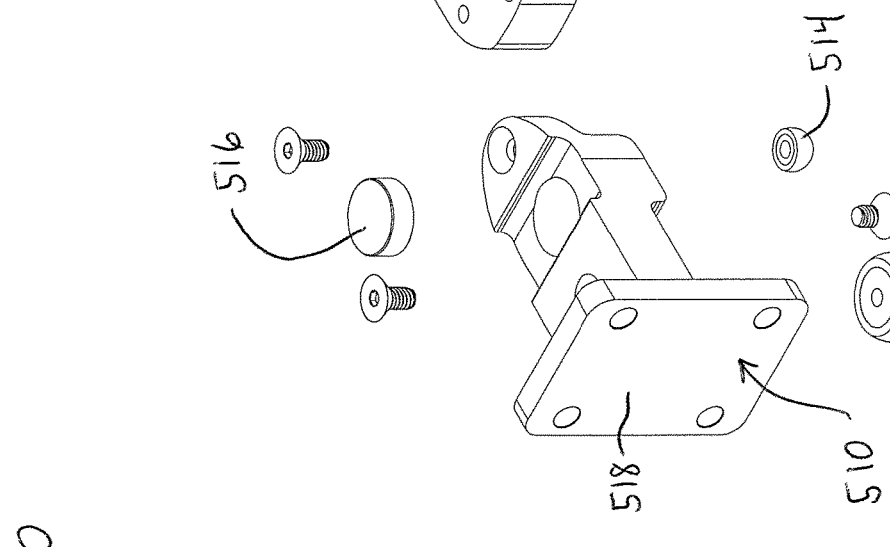
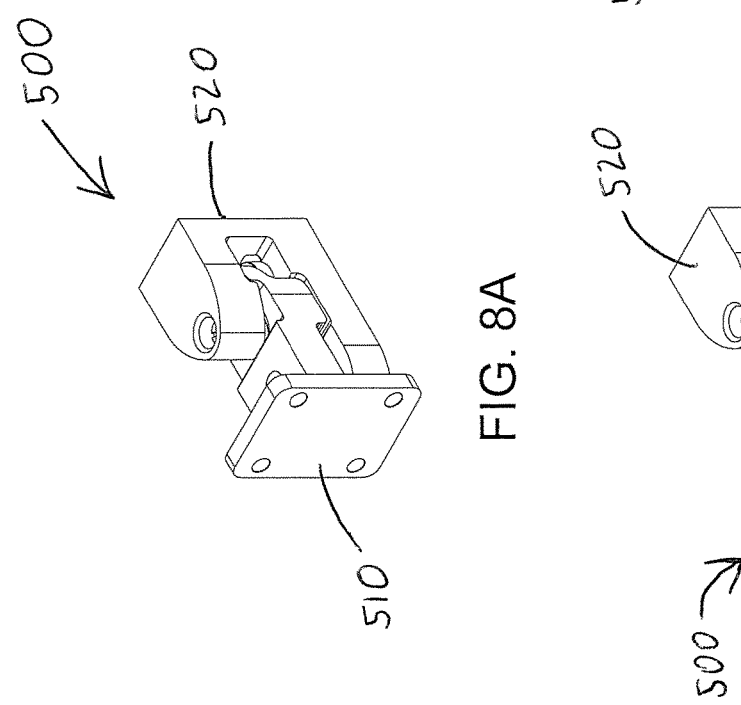
FIG. 8C
FIG. 8A
FIG. 8B

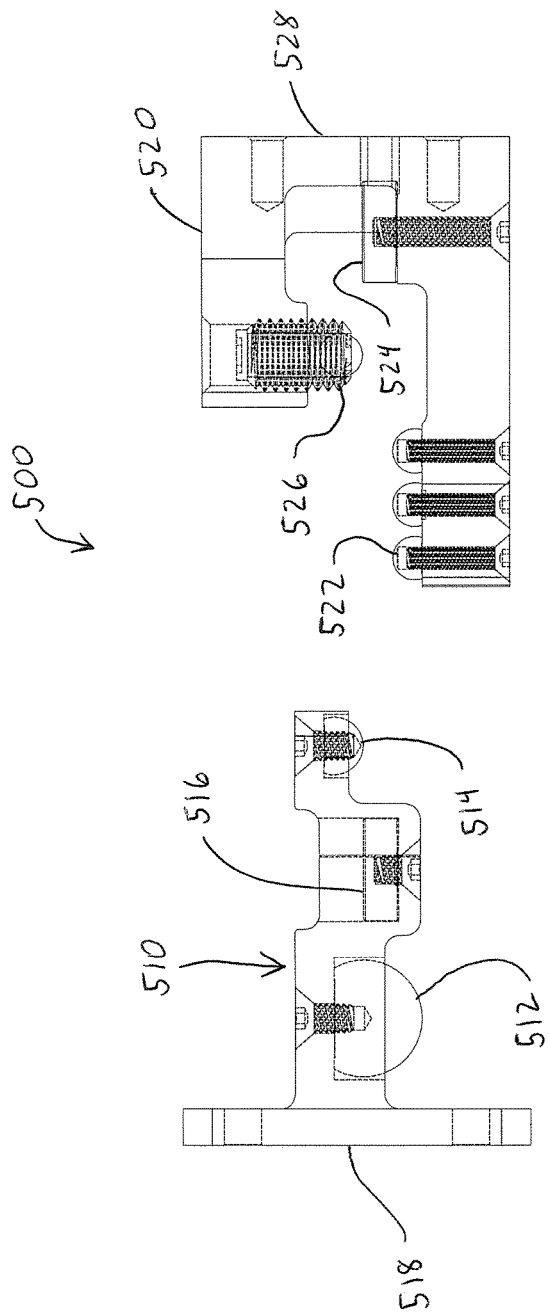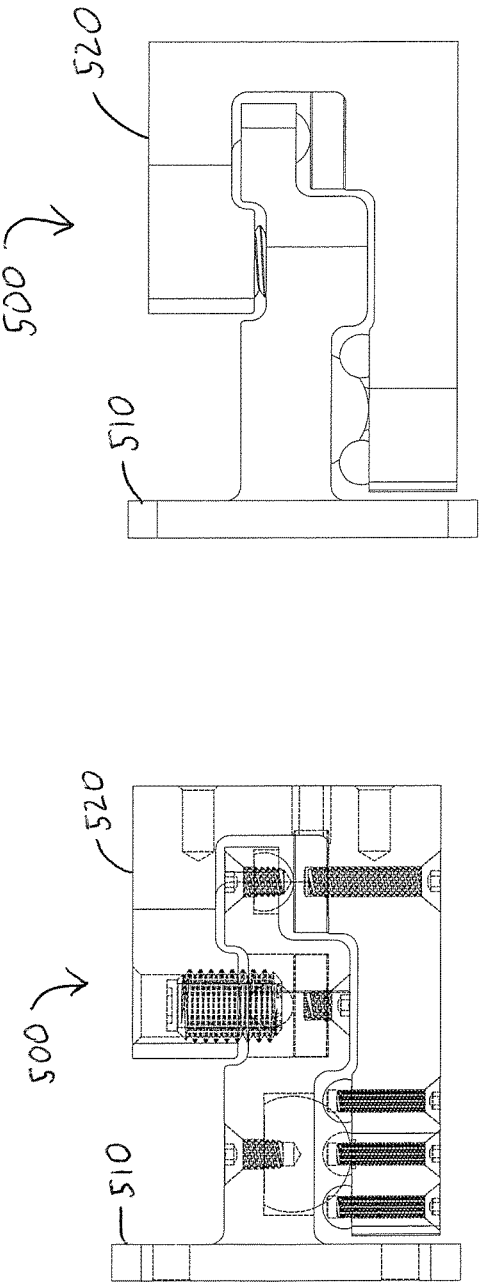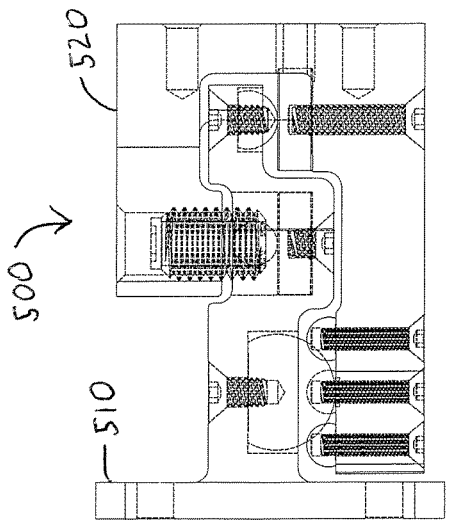
FIG. 8D
FIG. 8E
FIG. 8F

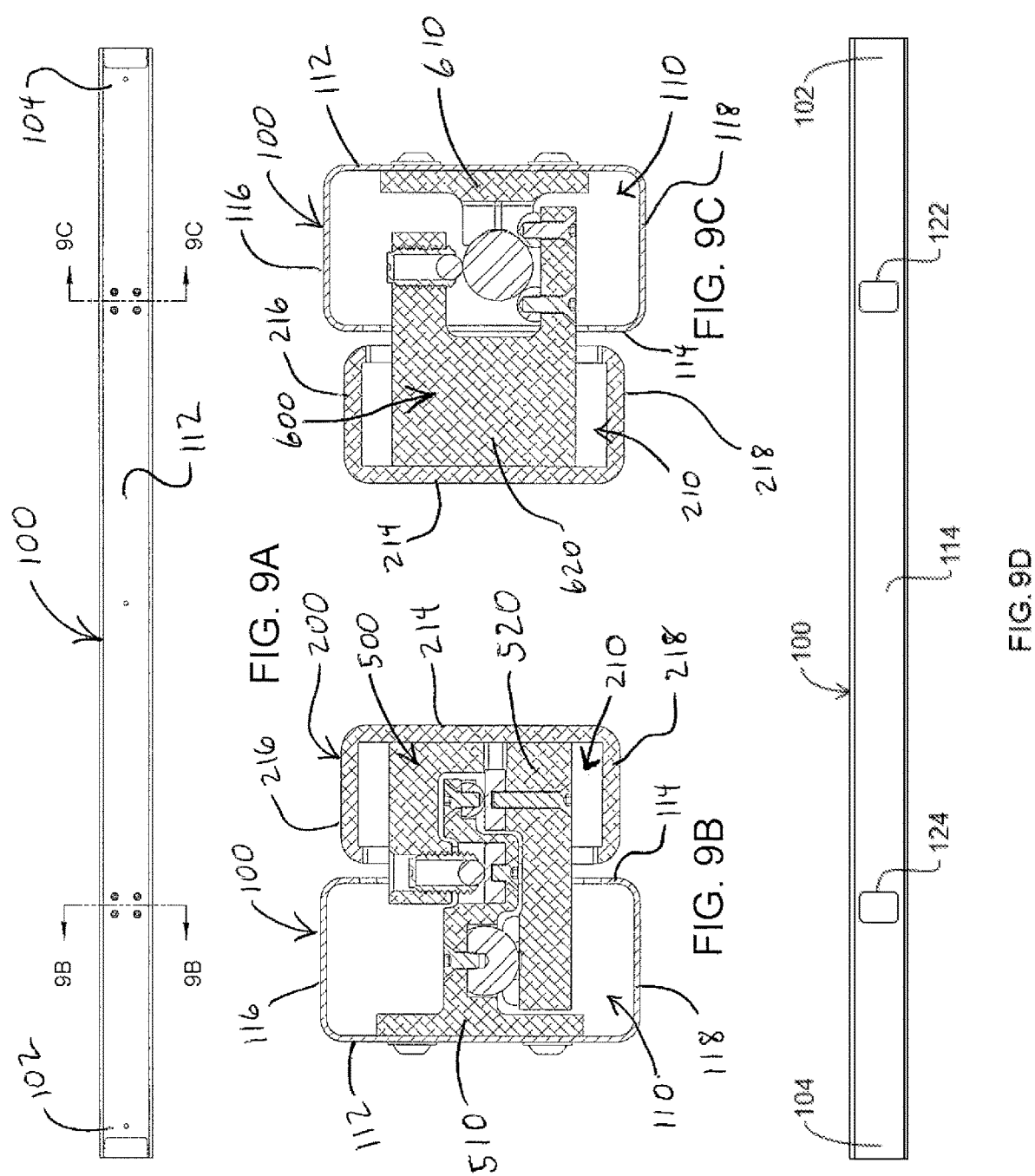

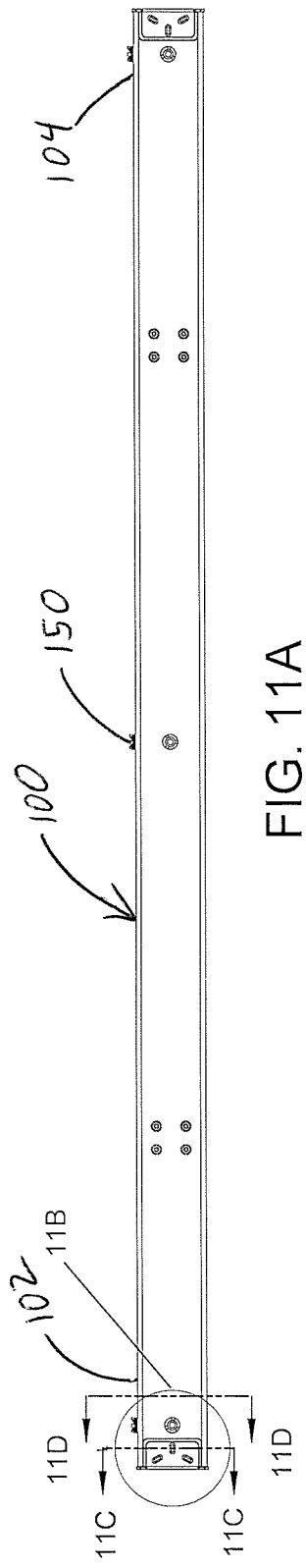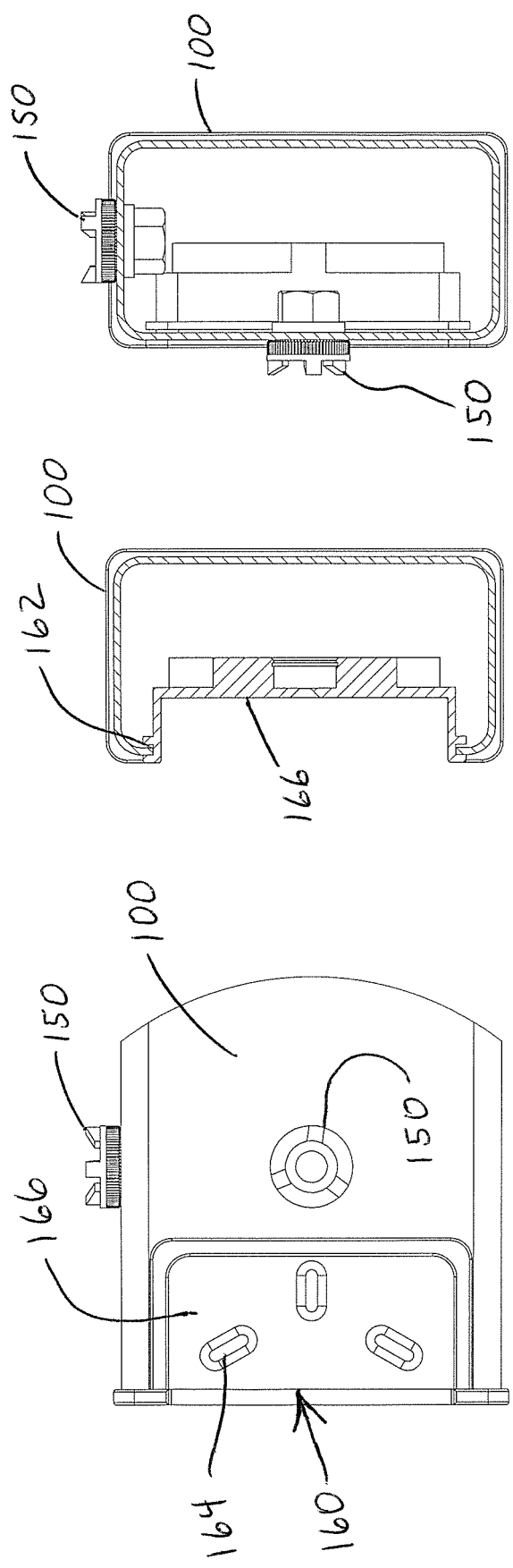
FIG. 11A
FIG. 11B
FIG. 11C
FIG. 11D

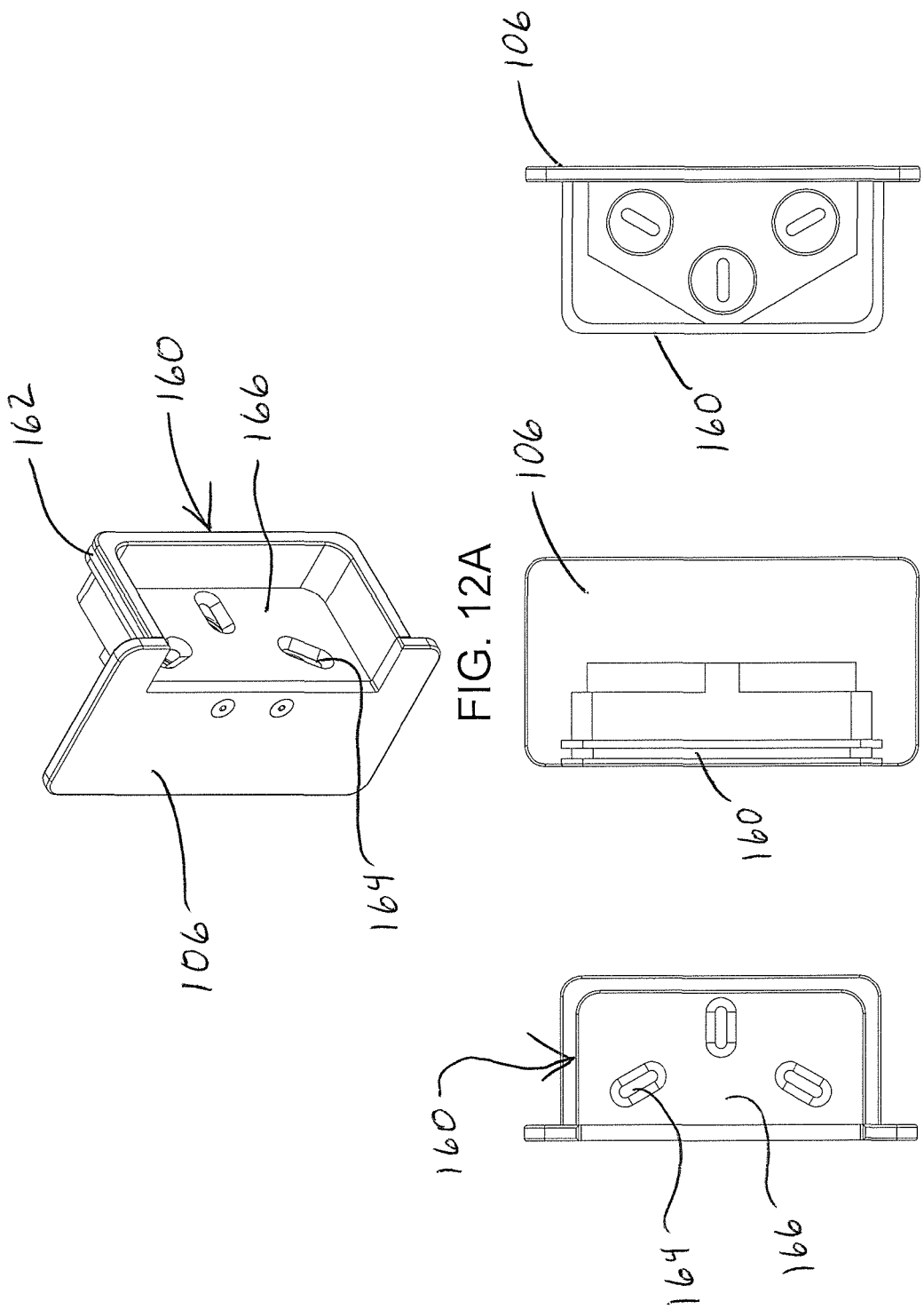

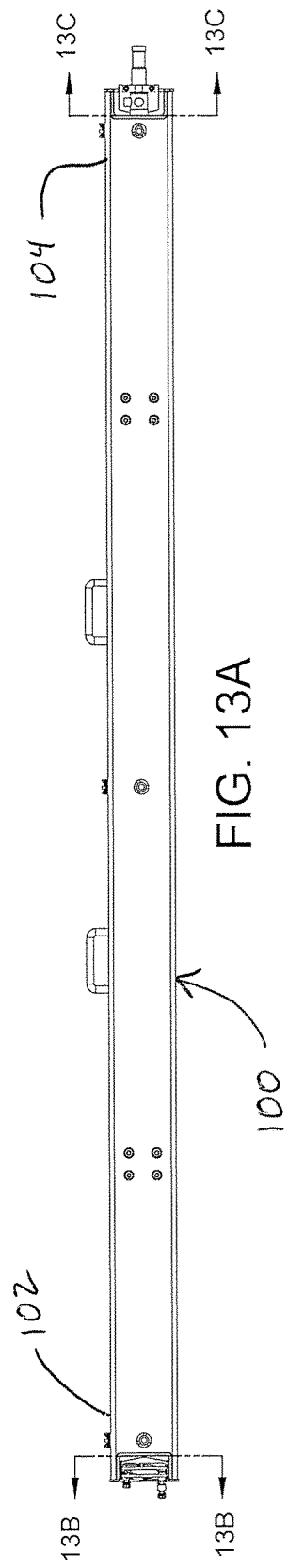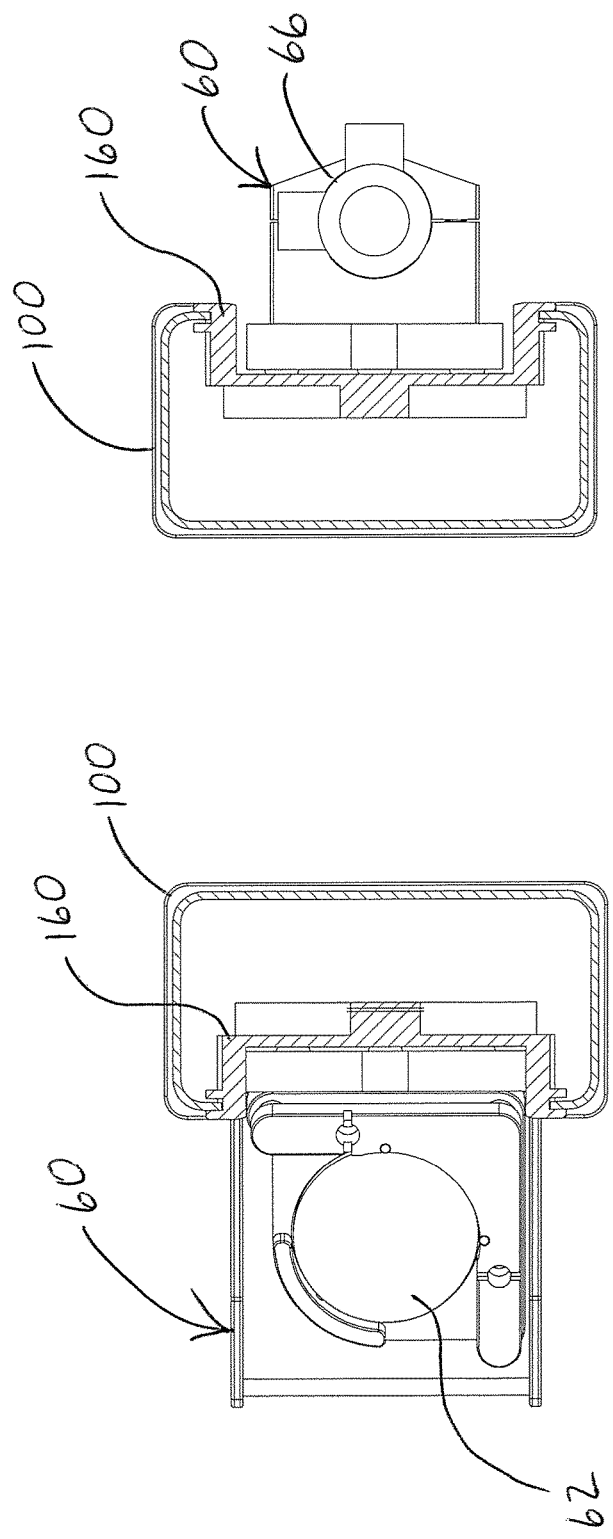
FIG. 13A
FIG. 13B
FIG. 13C

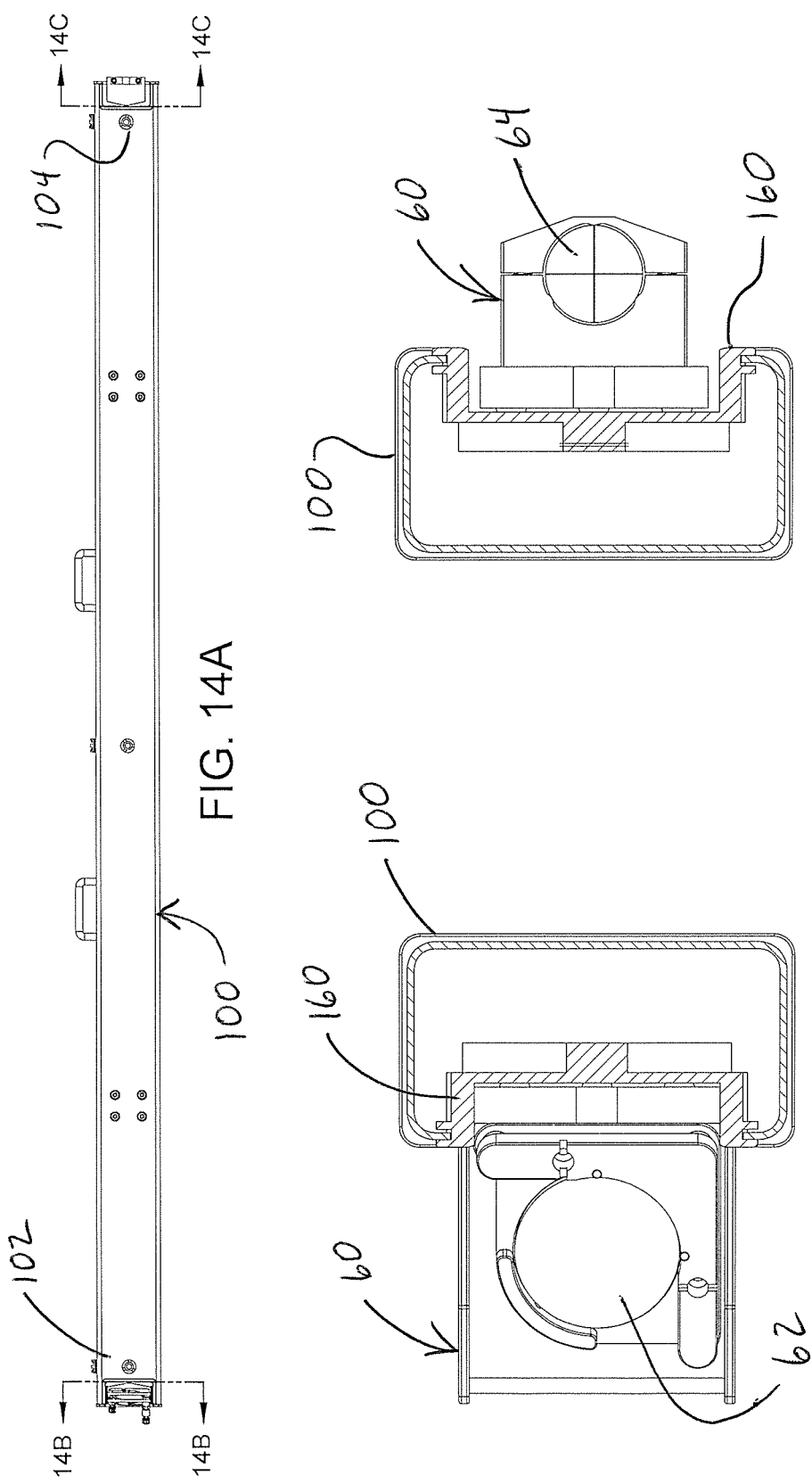

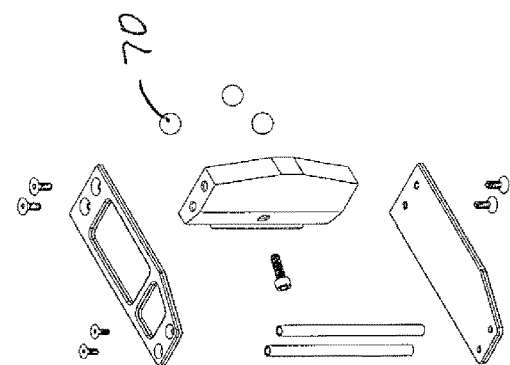
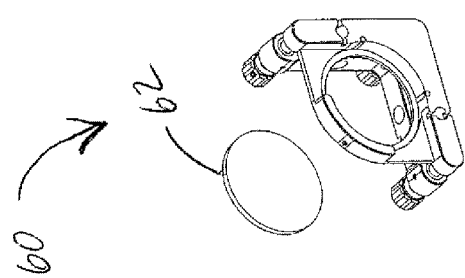
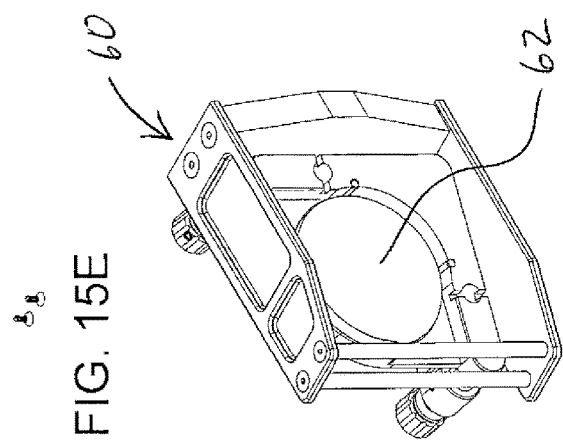
FIG. 15E
FIG. 15A
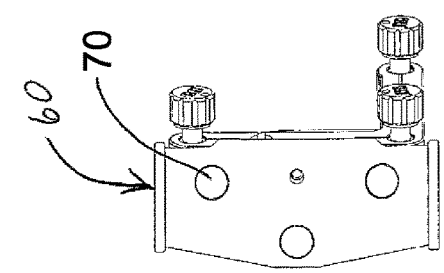
FIG. 15B
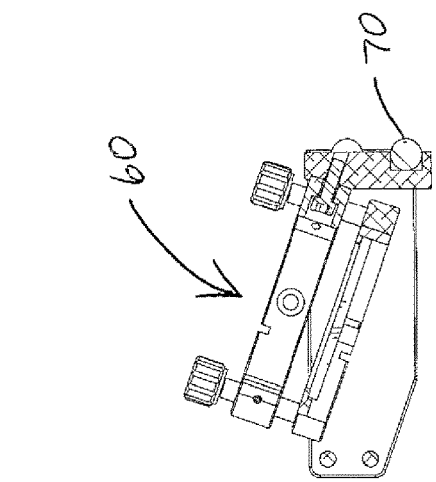
FIG. 15D
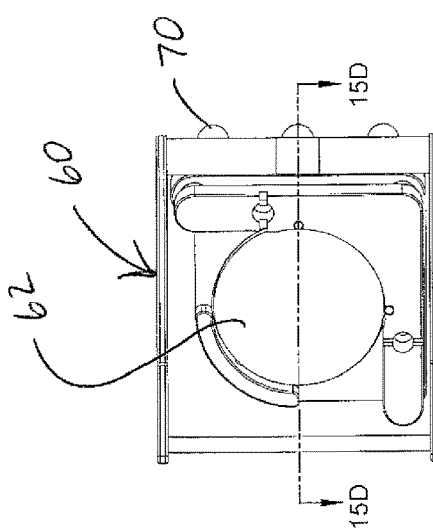
FIG. 15C

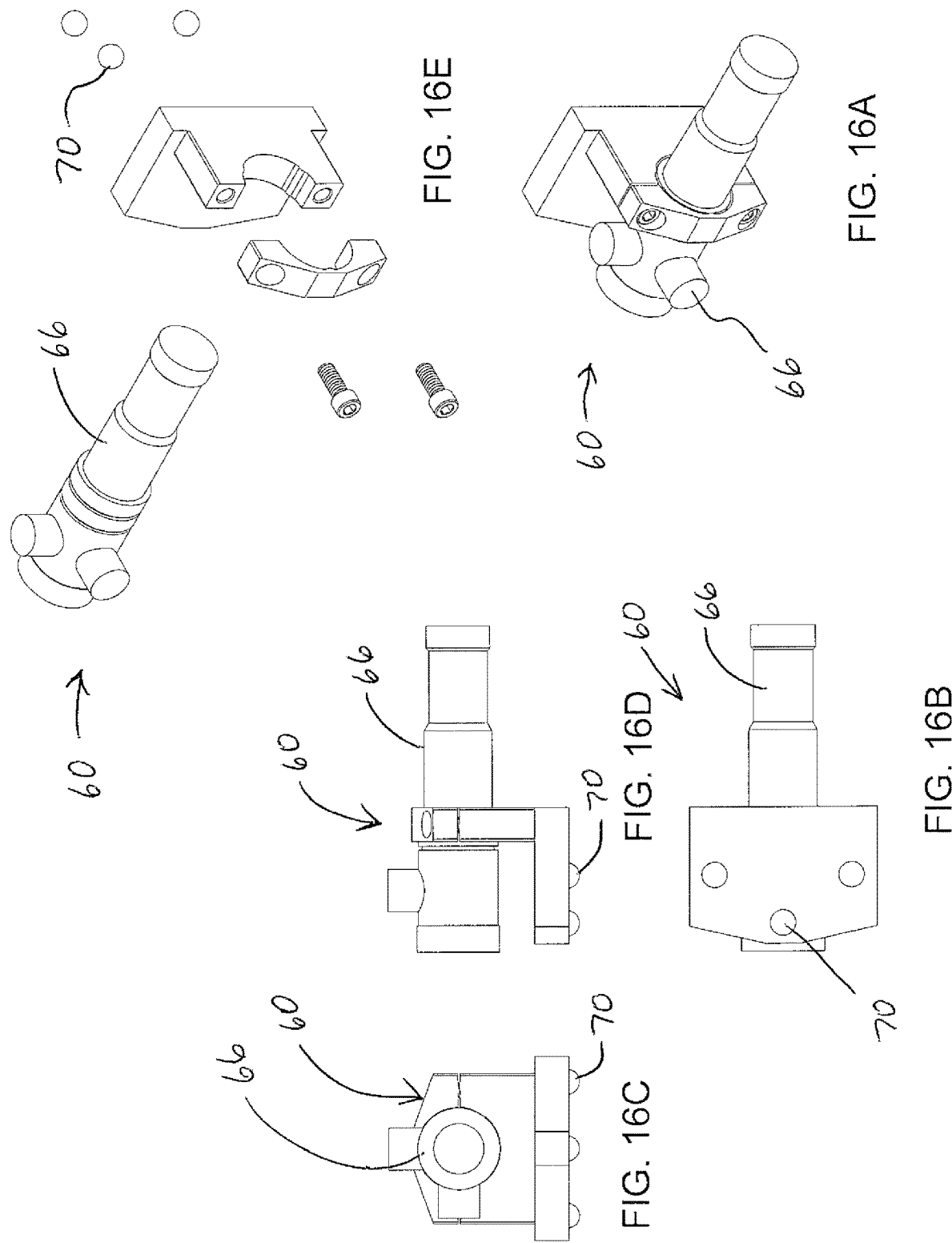

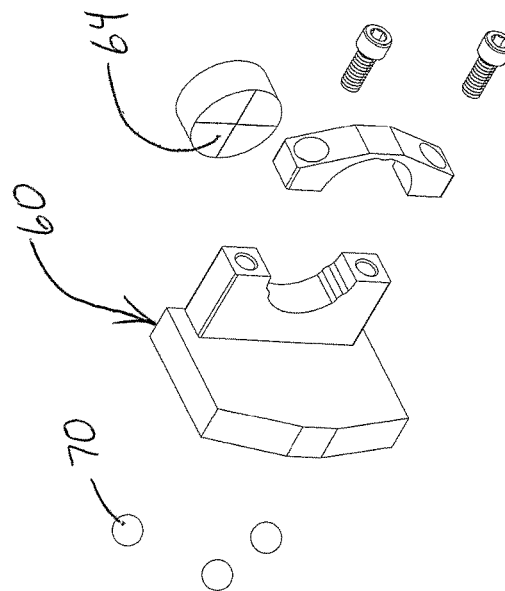
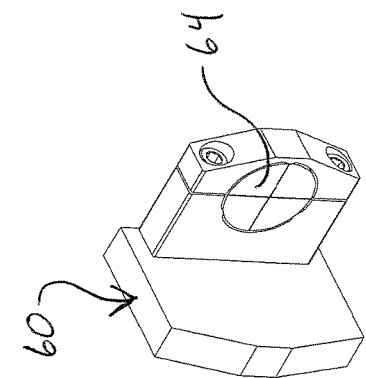
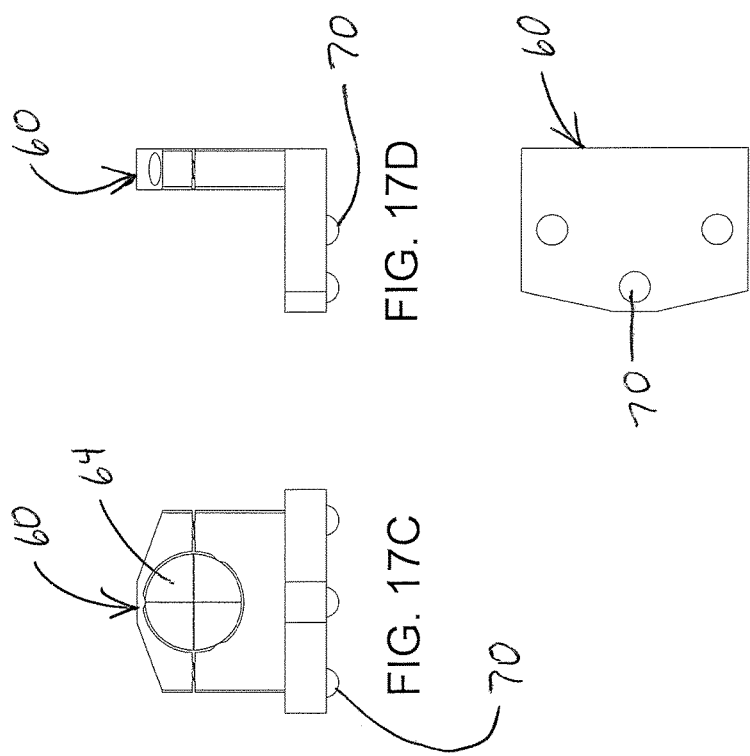

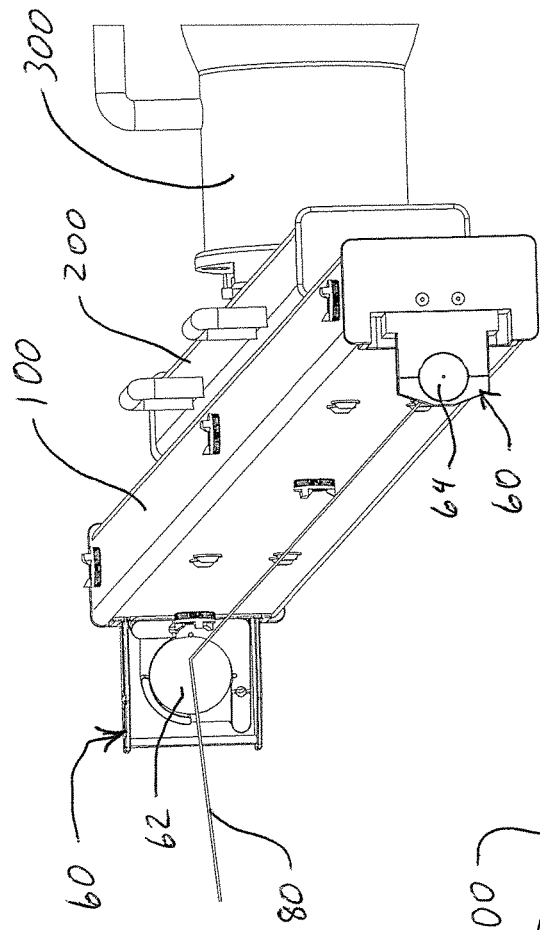
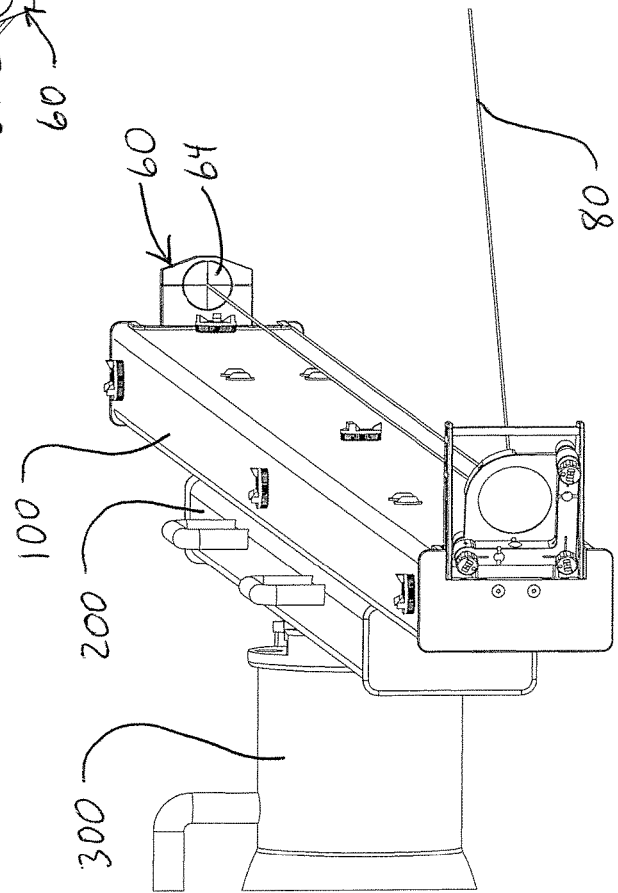

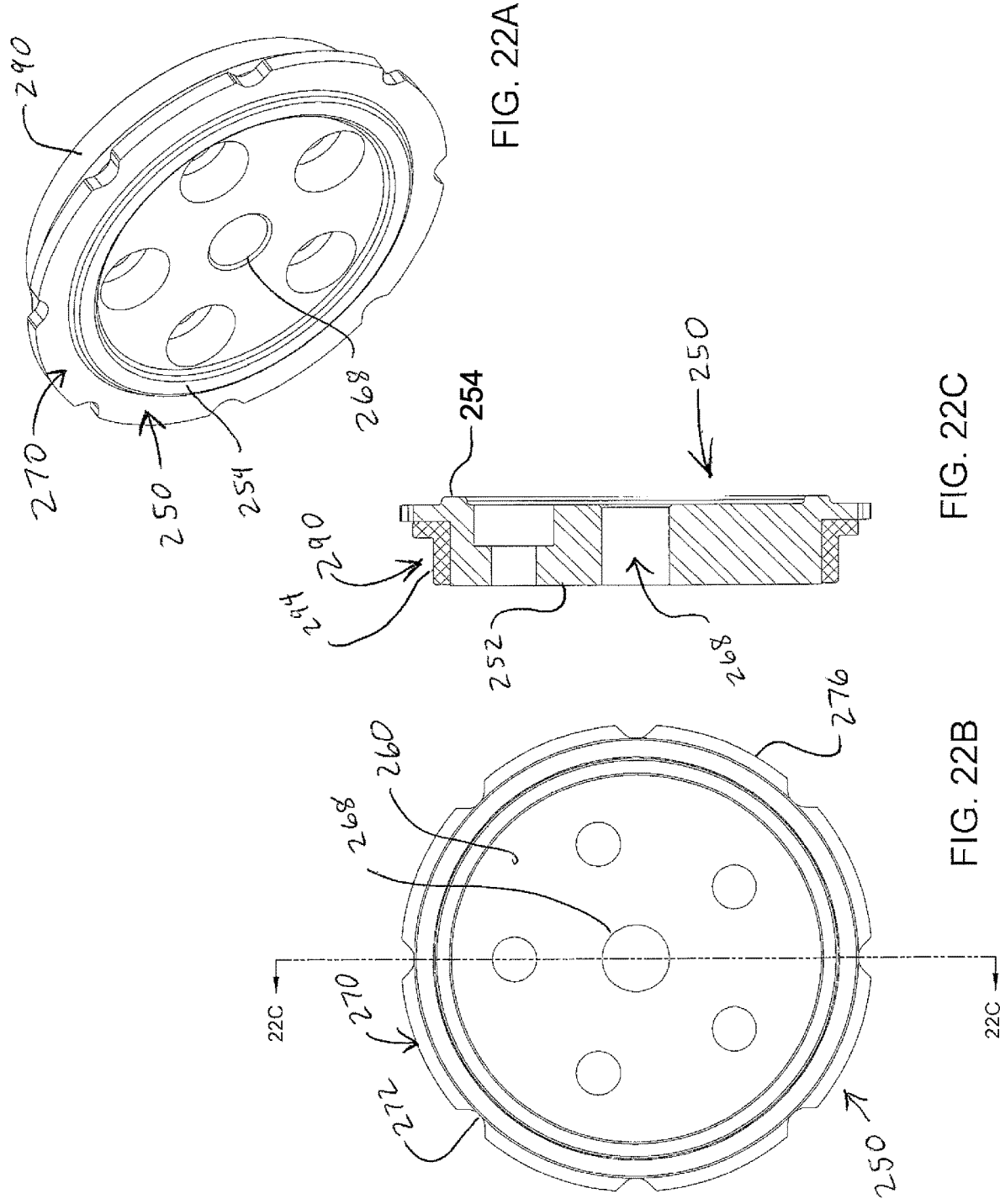

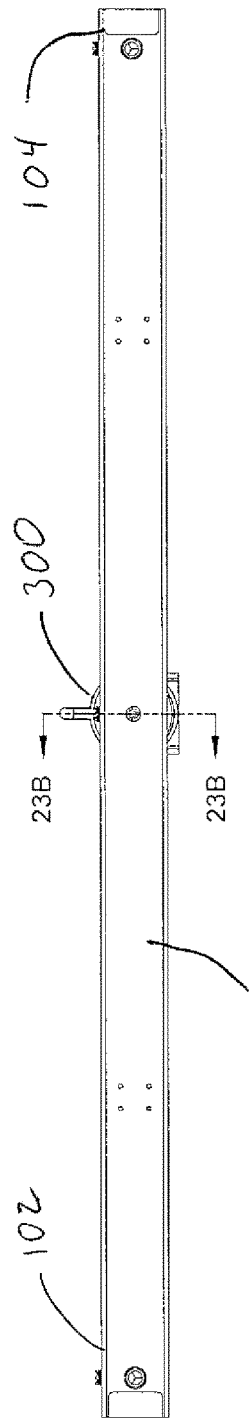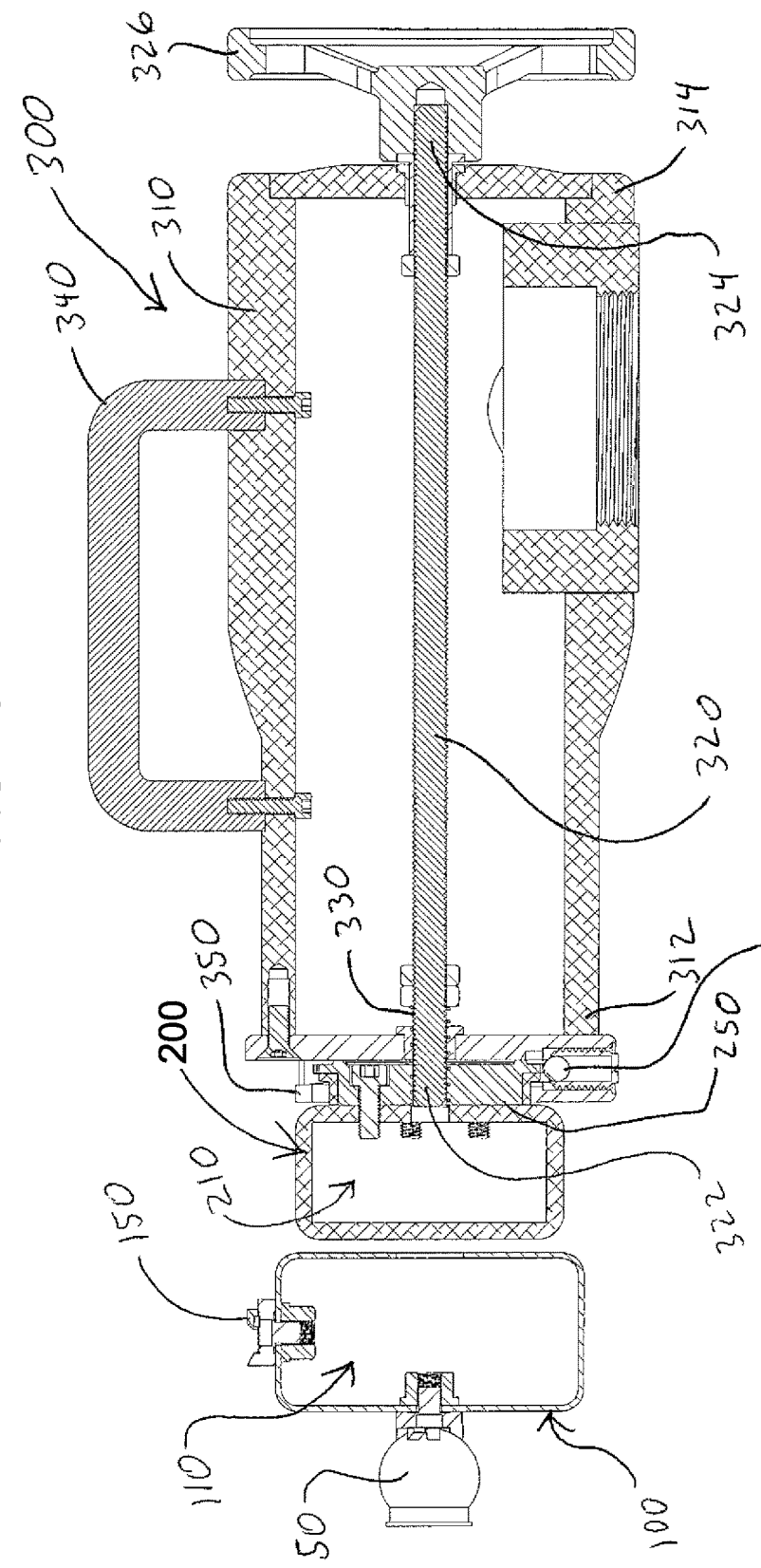
FIG. 23A
FIG. 23B

LASER TRACKER CALIBRATION SYSTEM AND METHODS

CROSS-REFERENCE TO RELATED APPLICATIONS

This application is a continuation-in-part application of each of the following:

U.S. patent application Ser. No. 15/437,127, filed Feb. 20, 2017, now U.S. Pat. No. 10,739,449, which is a continuation of U.S. patent application Ser. No. 14/796,683, filed Jul. 10, 2015, now U.S. Pat. No. 9,575,163, which claims priority pursuant to 35 U.S.C. 119(e) to U.S. Provisional Patent Application Ser. No. 62/022,917, filed Jul. 10, 2014 and titled "Laser Tracker Testing System", the entire disclosures of which are incorporated herein by reference; and U.S. patent application Ser. No. 16/112,299, filed Aug. 24, 2018, now U.S. Pat. No. 10,725,493, which claims priority pursuant to 35 U.S.C. 119(e) to U.S. Provisional Patent Application Ser. No. 62/549,504, filed Aug. 24, 2017 and titled "FOOT PEDAL ASSEMBLY", the entire disclosures of which are incorporated herein by reference.

FIELD OF THE INVENTION

The present invention relates generally to calibration devices for measuring equipment. More specifically, the present invention is concerned with a system and method for calibrating high precision measuring instruments, such as laser trackers and the like.

BACKGROUND OF THE INVENTION

A large number of industries require precise and accurate measuring for a number of applications such as production, manufacturing, and process control. In many such applications, measurement errors on the order of even one ten-thousandth of an inch can be critical. Often, especially when measuring the dimensions of large objects or a long distance between two objects, special equipment and/or instruments are used to achieve the necessary precision and accuracy for a particular application. Instruments such as laser trackers are particularly well suited for such applications because laser trackers are capable of providing extreme precision and accuracy, even when measuring the dimensions of large objects.

As is the case with calibration (or verifying proper calibration) of virtually any measuring instrument, checking calibration of a laser tracker is typically accomplished by measuring an object (such as a length reference artifact) of a standard, known length and confirming that the instrument measures the appropriate length. In particular, such artifacts are used to verify whether a laser tracker instrument is yielding trustworthy results (i.e. demonstrating that it is properly calibrated) or used during a measurement job to establish whether anything has gone wrong during the course of the job. For example, a user of the instrument will measure the artifact at the beginning, middle, and end of a job. If the user obtains the same length measurement each time, the user will have a degree of comfort that the tracker has maintained a proper adjustment and/or position during the measurement.

An acceptable method used to verify the proper calibration of a laser tracker is a length measurement system test. A length measurement system test involves several steps. First, two or more measuring points are located and oriented relative to a laser tracker. The measuring points are displaced a known distance from each other; the known distance being a reference length. Next, the laser tracker measures the distance between each measuring point; the measured distance being a measured length. Finally, the measured length is compared with the reference length so as to evaluate the performance of the laser tracker. Because a laser tracker may perform differently depending on the position and orientation of measuring points relative to the laser tracker, the above steps are repeated with the measuring points at various locations and orientations to exercise the various error sources within the tracker.

Prior to performing a length measurement system test, the reference length must be established. One method of establishing a reference length is described in Section D-3 of ASME B89.4.19-2006. Using this method, the measuring points are aligned with the laser tracker so that the distance between the measuring points may be measured with the more accurate ranging system of the tracker (such as an interferometer or Absolute Distance Meter system). Another method of establishing a reference length is to use a calibrated artifact.

A calibrated artifact includes a measuring point on or near each end of the artifact. Traditionally, artifacts were calibrated at a specific temperature range and nominal thermal expansion corrections are provided to establish the reference length between the measuring points. More recently, several length reference systems have been developed that include structural arrangements that are designed to counteract length increases caused by thermal expansion. For example, U.S. application Ser. No. 13/431,188, now U.S. Pat. No. 8,479,406, the entire disclosure of which is incorporated herein by reference, discloses a length reference bar system and method that compensates for thermal expansion and is capable of being calibrated using the method described in Section D-3 of ASME B89.4.19-2006. Other length reference systems disclosed in U.S. Pat. Nos. 6,505,495, 6,836,323, and 7,188,428, the entire disclosures of which are incorporated herein by reference, have also been designed to counteract length increases caused by thermal expansion. Still other length reference systems are fabricated from materials having low coefficients of thermal expansion, such as carbon composite and/or high-grade invar, to further reduce the artifact's sensitivity to temperature gradients.

When using an artifact to perform a length measurement system test, the artifact is positioned and oriented so as to move the measuring points to various locations and orientations relative to the laser tracker. For example, the artifact may be oriented vertically for a first test, horizontally for a second test, and diagonally for a third test. In each orientation, the measuring points may be positioned symmetrically or asymmetrically relative to the laser tracker.

Precise and accurate movement of an artifact to a specific position and orientation is time consuming and difficult. Consequently, positioning repeatability is also time consuming and difficult. Once in position, maintaining the position and orientation of the artifact can be difficult. A fixture may solve some of these problems, but a fixture also creates additional uncertainty with the accuracy of the reference length.

To ensure that a length measurement system test is as accurate as possible, the reference length must be as close as possible to the actual distance between the measuring points at the time the measured length is obtained. Unfortunately, several factors, such as "fixturing effects," create uncertainty as to the accuracy of a reference length "Fixturing effects"

may include, but are not limited to, gravity effects, loading effects, and mounting constraint effects. "Fixturing effects" may be influenced by factors such as the straightness and/or stiffness of an artifact, the type, quantity, and/or location of mounting fixtures, the location of targets relative to the mounting fixtures, potential vibration, and/or the accuracy of an alignment. Additionally, uncertainty of the artifact temperature and uncertainty of the coefficient of thermal expansion of the artifact material create uncertainty with the thermal expansion correction values (if used).

Fixturing effects may vary with temperature and/or with the orientation of the artifact. Accordingly, fixturing effects may be difficult to detect and/or to predict. For instance, an artifact at room temperature and situated in a vertical orientation may experience negligible fixturing effects while an artifact at twenty degrees above room temperature and situated in a horizontal orientation may experience various fixturing effects such as thermal expansion restraint and/or cantilever bending. Thermal expansion restraint creates additional uncertainty with the thermal expansion correction values. Cantilever bending creates additional uncertainty with the calibrated length of the artifact at various orientations.

Therefore, it is desirable to provide a reference length system and method that quickly moves measuring points into precise and accurate locations and orientations relative to a laser tracker, thereby allowing for positioning repeatability, that maintains an accurate reference length, that is easy to manufacture, and that is simple to use. Furthermore, it is desirable to provide a system and method for quickly and easily determining a reliable reference length between measuring points.

SUMMARY OF THE INVENTION

The present invention solves the foregoing problems through the utilization of a unique calibration and testing system as well as a unique method of using the calibration and testing system to orient measuring points relative to a laser tracker.

The present invention pertains generally to a laser tracker calibration and testing system and a method of quickly and easily verifying the accuracy of a laser tracker. Particularly, the present invention pertains to positioning and holding measuring points, such as laser targets, in a particular configuration. In one embodiment, a spherically mounted retro-reflective laser tracker target (SMR) is coupled to an artifact such that positioning and holding the SMR in a particular configuration is accomplished by moving the artifact to, and holding the artifact in, a particular orientation.

The artifact is constructed from a material having a low coefficient of thermal expansion. Additionally, the artifact is designed to be relatively lightweight and rigid so as to enable portability while minimizing elastic deformations. For instance, in one embodiment the artifact is a carbon fiber composite beam. In another embodiment, the artifact is fabricated from a hollow rectangular beam.

The present invention also pertains to a support system and a method of supporting the artifact. In one embodiment, the support system includes a support beam and two kinematic mounts that are utilized to securely couple the artifact to the support beam. In some such embodiments, the first and second kinematic mounts, combined, approximately represent a Kelvin Clamp.

Some embodiments of the support system includes a ring brake and a yoke that is configured to receive the ring brake. In one such embodiment, the ring brake defines a first diameter and a flange extending from the first diameter defines a second diameter. In such an embodiment, the yoke defines a first slot for receiving the first diameter of the ring brake and a second slot for receiving the flange of the ring brake. In one such embodiment, the first slot of the yoke defines a bearing surface in communication with the first diameter of the ring brake. In another such embodiment, the ring brake includes a ring brake bushing defining an inner diameter and an outer diameter. In one such embodiment, the inner diameter is in communication with the first diameter of the ring brake and the first slot of the yoke defines a bearing surface in communication with the outer diameter of the ring brake bushing.

Another embodiment of the support system includes a primary rod for selectively coupling a ring brake to a yoke when the ring brake is received by the yoke. In one such embodiment, the primary rod is biased away from the ring brake so that the ring brake may be readily received by the yoke. In another such embodiment, a second slot of the yoke defines a back surface and the ring brake defines an interface surface that is configured to interface with the back surface of the second slot of the yoke when the ring brake is selectively coupled to the yoke. In one such embodiment, the interface surface is defined by one or more raised surfaces.

Yet another embodiment of the support system includes a positioner housing having first and second ends. In one such embodiment, a yoke is coupled to the first end of the positioner housing and a primary rod extends from the second end of the positioner housing past the first end of the positioner housing so as to enable selectively coupling a ring brake to the yoke. In one such embodiment, a hand wheel is coupled to the primary rod at the second end of the primary housing.

One embodiment of the positioner housing includes an adjustable base member that is capable of supporting the positioner housing at various heights above the ground. Another embodiment of the positioner housing includes a base member that is capable of coupling the positioner housing to a support structure, such as a tri-pod, so as to enable the adjustable positioning of the positioner housing relative to the ground.

The present invention also pertains to an orientation and selective restraint system and a method for orienting and securely holding an artifact in a particular orientation. In one embodiment of the orientation and selective restraint system, a ring brake is rotatably coupled to a yoke such that rotation of the ring brake relative to the yoke rotates the artifact relative to the yoke. In one such embodiment, a user may orient the artifact without touching the artifact. In this way, the artifact may be oriented without introducing heat energy from a user's hand into the artifact.

Another embodiment of the orientation and selective restraint system includes a restraining mechanism to selectively restrain a ring brake from rotating relative to a yoke, thereby securely holding an artifact in a particular orientation. In one embodiment, the ring brake includes a flange defining a plurality of locating features for haptic feedback and positioning repeatability. In one such embodiment, each locating feature is one of a tab, an indentation, and/or an aperture. In another embodiment, the restraining mechanism includes a plunger that is movable between an engaged configuration and a disengaged configuration. In the engaged configuration, the plunger is in communication with at least one locating feature such that the ring brake is prevented from rotating relative to the yoke. In the disengaged configuration, the plunger is displaced from the locating feature such that the ring brake is allowed to rotate relative to the yoke. In one such embodiment, the plunger is biased towards the engaged configuration.

The present invention also pertains to a portability system and a method of quickly and easily moving the laser tracker calibration and testing system from one location to another. In one embodiment, the positioner housing includes a handle to increase the portability. In another embodiment, the support beam includes at least one handle to increase the portability of the support beam.

The present invention also pertains to an alignment system and a method of aligning measuring points, such as target spheres, relative to a laser tracker. In one embodiment, each end of the artifact includes an accessory tray that is configured so as to selectively receive an alignment accessory. In one such embodiment, the alignment accessories are mounted on kinematics for repeatability. In another such embodiment, the alignment accessories are equally weighted and positioned symmetrically to reduce and/or negate their effects on the reference length.

In one embodiment, each alignment accessory is one of an alignment mirror, an alignment target, or an alignment laser. In one such embodiment, an alignment mirror and an alignment laser are selectively coupled to opposed ends of the artifact. In another such embodiment, an alignment mirror and an alignment target are selectively coupled to opposed ends of the artifact.

In one method of the present invention, an alignment mirror is selectively coupled to a first end of an artifact and an alignment laser is selectively coupled to an opposed second end of the artifact. The alignment laser and the alignment mirror are positioned such that the alignment laser projects a beam of light across the length of the artifact through the virtual centers of the target spheres onto a reflective surface of the alignment mirror. The alignment mirror is steered so that the alignment beam is collinear with the laser tracker beam and coincident with the laser tracker aperture. In this way, the alignment mirror and the alignment laser are capable of being used to quickly and easily align the beam of the laser tracker with the centers of the target spheres.

In another method of the present invention, an alignment mirror is selectively coupled to a first end of an artifact and an alignment target is selectively coupled to an opposed second end of the artifact. A laser tracker beam is pointed at the alignment mirror and the alignment mirror is steered until the laser tracker beam projects across the length of the artifact through the virtual centers of the target spheres onto the alignment target. In this way, the alignment mirror, the alignment target, and the laser tracker beam are capable of being used to quickly and easily align the beam of the laser tracker with the virtual centers of the target spheres.

With nominal manufacturing tolerances, the present invention enables sufficient alignment to meet buck-in requirements to isolate the ranging system of the tracker. As a result, wear and tear on the tracker is reduced because the traditional procedure of re-locating the tracker in-line with the virtual centers of the targets is eliminated.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 7A is an isometric view of a second kinematic mount of the present invention, the second kinematic mount being in an assembled configuration.

FIG. 7B is an isometric view of the second kinematic mount of FIG. 7A, the second kinematic mount being in a disassembled configuration.

FIG. 7C is an exploded isometric view of the second kinematic mount of FIG. 7A.

FIG. 8A is an isometric view of a first kinematic mount of the present invention, the first kinematic mount being in an assembled configuration.

FIG. 8B is an isometric view of the first kinematic mount of FIG. 8A, the first kinematic mount being in a disassembled configuration.

FIG. 8C is an exploded isometric view of the first kinematic mount of FIG. 8A.

FIG. 8D is a side view of the first kinematic mount of FIG. 8A, the first kinematic mount being in an assembled configuration.

FIG. 8E is a transparent side view of the first kinematic mount of FIG. 8A, the first kinematic mount being in an assembled configuration.

FIG. 8F is a transparent side view of the first kinematic mount of FIG. 8A, the first kinematic mount being in a disassembled configuration.

FIG. 9A is a front view of the artifact of FIG. 1.

FIG. 9B is a sectional view taken along line 9B-9B of FIG. 9A.

FIG. 9C is a sectional view taken along line 9C-9C of FIG. 9A.

FIG. 9D is a rear view of the artifact of FIG. 9A.

FIG. 11A is a front view of the artifact of FIG. 1.

FIG. 11B is an isolated view on an enlarged scale of a portion of FIG. 11A.

FIG. 11C is a sectional view taken along line 11C-11C of FIG. 11A.

FIG. 11D is a sectional view taken along line 11D-11D of FIG. 11A.

FIG. 12A is an isometric view of an accessory tray of the present invention.

FIG. 12B is a front view of the accessory tray of FIG. 12A.

FIG. 12C is a side view of the accessory tray of FIG. 12A.

FIG. 12D is a side view of the accessory tray of FIG. 12A.

FIG. 13A is a front view of an artifact of the present invention showing an alignment mirror coupled to a first end of the artifact and an alignment laser coupled to an opposed second end of the artifact.

FIG. 13B is a sectional view taken along line 13B-13B of FIG. 13A.

FIG. 13C is a sectional view taken along line 13C-13C of FIG. 13A.

FIG. 14A is a front view of an artifact of the present invention showing an alignment mirror coupled to a first end of the artifact and an alignment target coupled to an opposed second end of the artifact.

FIG. 14B is a sectional view taken along line 14B-14B of FIG. 14A.

FIG. 14C is a sectional view taken along line 14C-14C of FIG. 14A.

FIG. 15A is an isometric view of an alignment mirror of the present invention.

FIG. 15B is a rear view of the alignment mirror of FIG. 15A.

FIG. 15C is a side view of the alignment mirror of FIG. 15A.

FIG. 15D is a sectional view taken along line 15D-15D of FIG. 15C.

FIG. 15E is an exploded sectional view of the alignment mirror of FIG. 15A.

FIG. 16A is an isometric view of an alignment laser of the present invention.

FIG. 16B is a rear view of the alignment laser of FIG. 16A.

FIG. 16C is a side view of the alignment laser of FIG. 16A.

FIG. 16D is a top view of the alignment laser of FIG. 16A.

FIG. 16E is an exploded sectional view of the alignment laser of FIG. 16A.

FIG. 17A is an isometric view of an alignment target of the present invention.

FIG. 17B is a rear view of the alignment target of FIG. 17A.

FIG. 17C is a side view of the alignment target of FIG. 17A.

FIG. 17D is a top view of the alignment target of FIG. 17A.

FIG. 17E is an exploded view of the alignment target of FIG. 17A.

FIG. 19A is a perspective view of the artifact of FIG. 14A showing a beam of light being directed towards the alignment mirror and reflecting off of the alignment mirror towards the alignment target.

FIG. 19B is a perspective view of the artifact of FIG. 19A, shown at a different angle as FIG. 19A.

FIG. 22A is a perspective view of the bushing of FIG. 21B being installed onto the ring brake of FIG. 21A.

FIG. 22B is a front view of the ring brake of FIG. 22A.

FIG. 22C is a sectional view taken along line 22C-22C of FIG. 22B, the view showing the bushing being installed on the ring brake.

FIG. 23A is a front view of the artifact and part of the support system of FIG. 5.

FIG. 23B is a sectional view taken along line 23B-23B of FIG. 23A.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
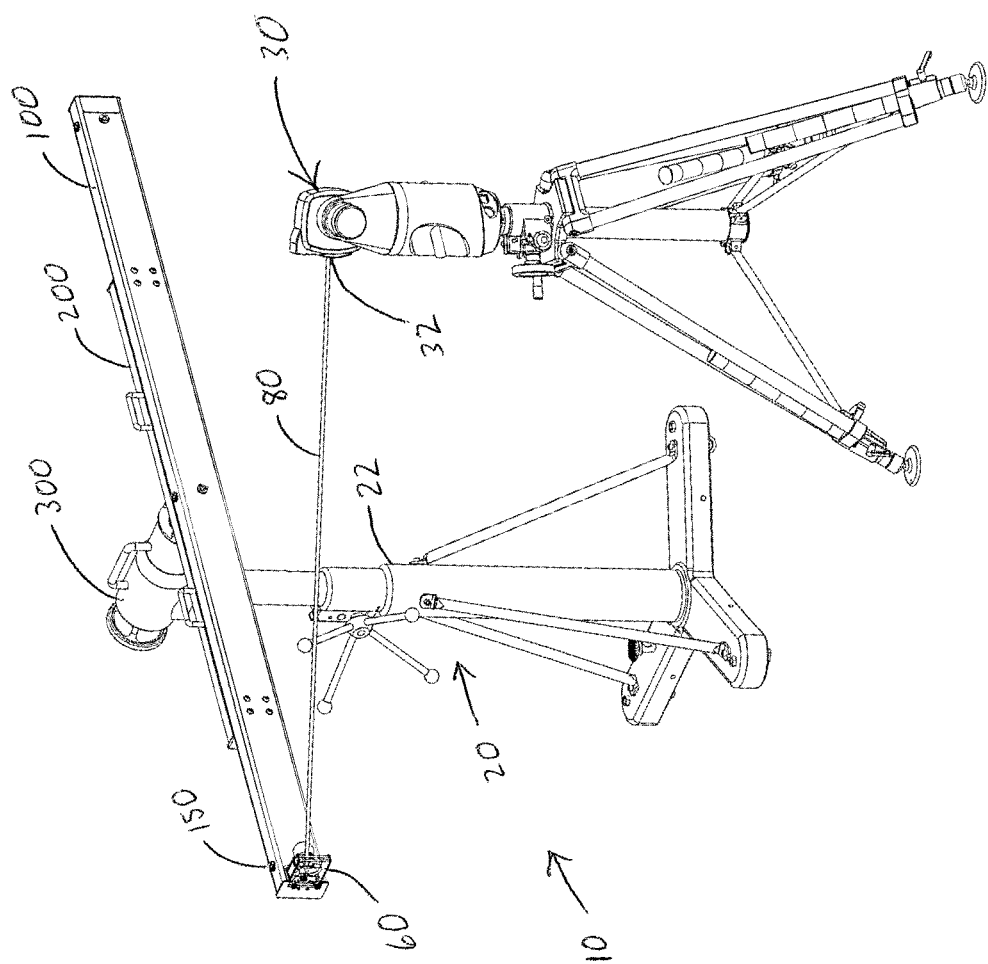
FIG. 1 is an isometric view of an artifact of the present invention being supported by a support system of the present invention and being positioned relative to a laser tracker so as to perform a method of the present invention.
Figure 2:
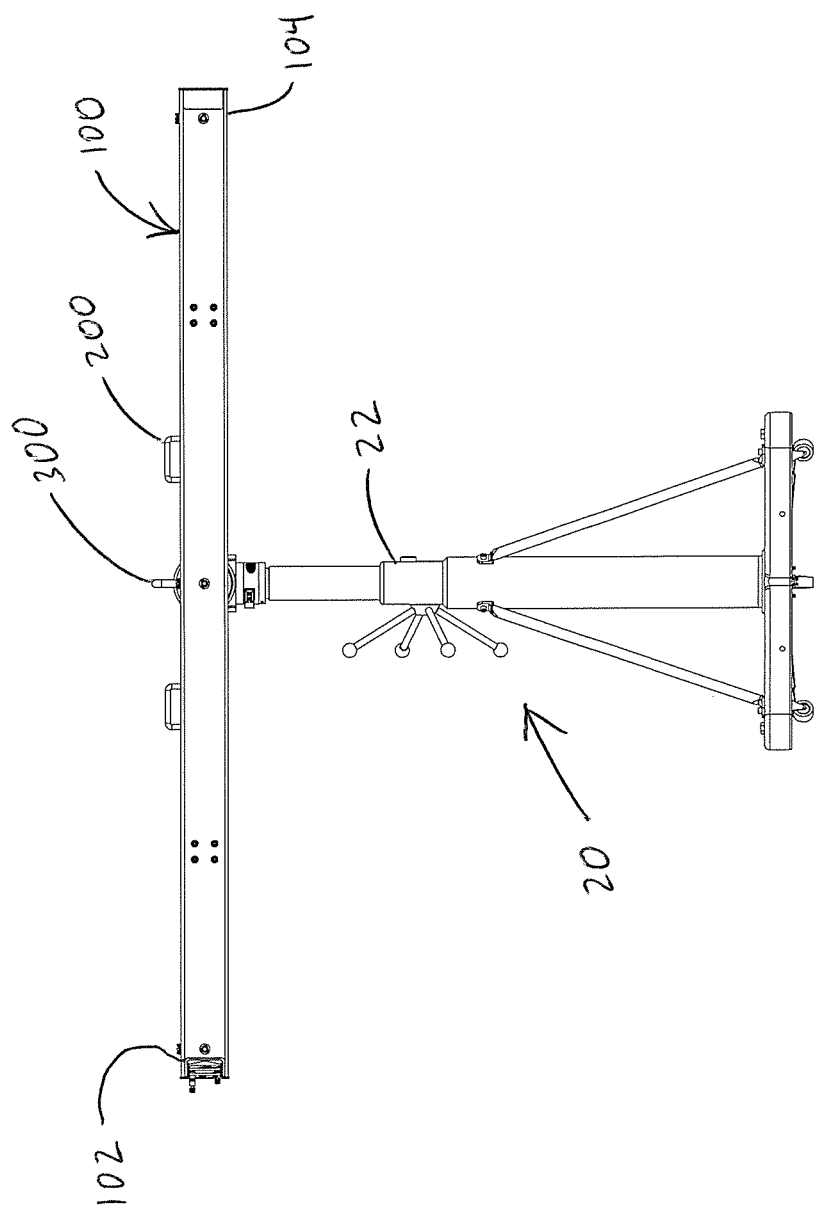
FIG. 2 is a front view of the artifact and support system of FIG. 1, showing the artifact in a horizontal configuration.
Figure 3:
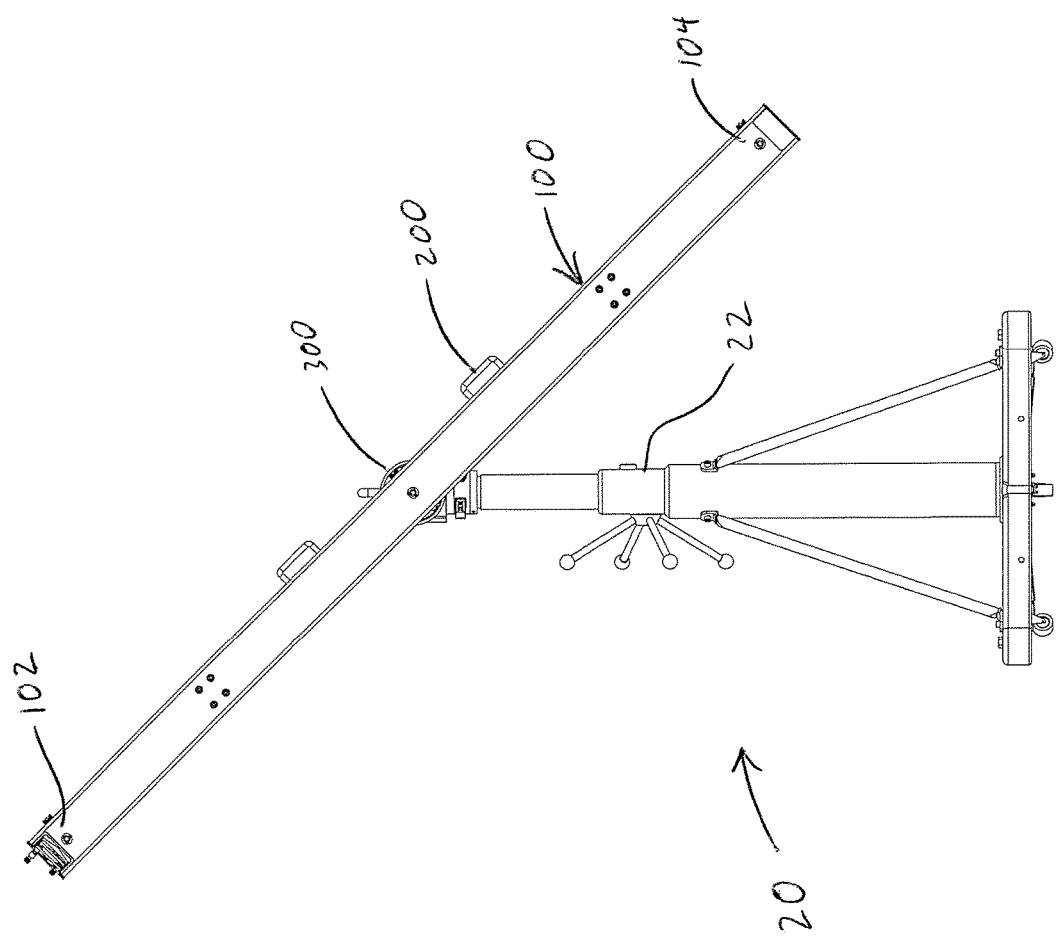
FIG. 3 is a front view of the artifact and support system of FIG. 1, showing the artifact in an angled configuration.
Figure 4:
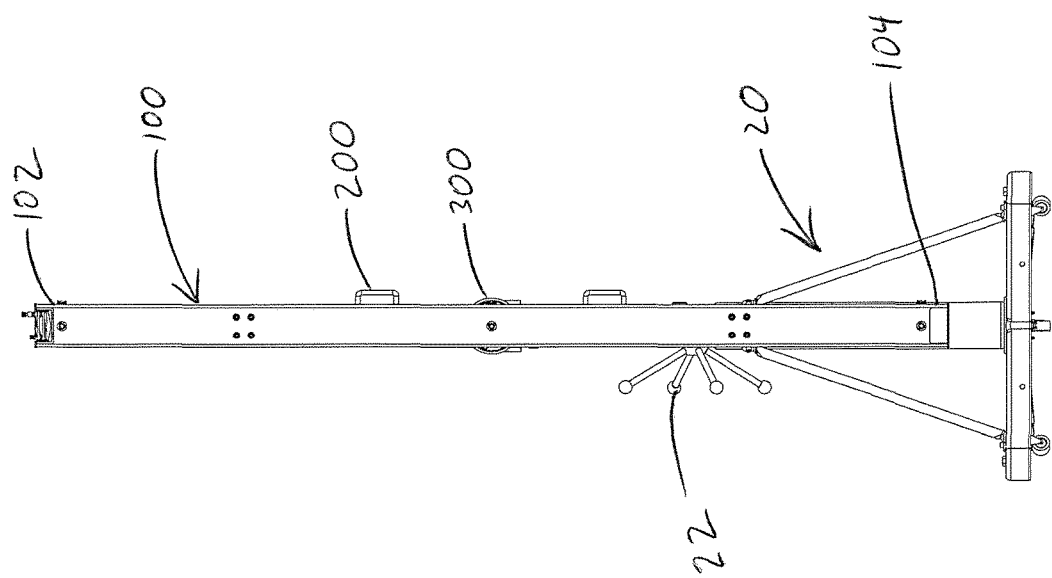
FIG. 4 is a front view of the artifact and support system of FIG. 1, showing the artifact in a vertical configuration.

Referring to FIG. 1, the laser tracker calibration and testing system 10 of the present invention includes an artifact 100 and a support system 20 for the artifact. In some embodiments, the artifact 100 is a hollow rectangular beam that is constructed from a light-weight but rigid composite material that has a low coefficient of thermal expansion. In this way, the artifact remains portable while minimizing deformations. In some such embodiments, the artifact 100 includes opposed front 112 and rear 114 walls extending between first 102 and second 104 ends of the artifact 100 and opposed top 116 and bottom 118 walls extending between respective top and bottom edges of the front 112 and rear 114 walls so as to define an interior area 110. In other such embodiments, the artifact 100 includes end caps 106 coupled to each end of the artifact 100 so as to cap the hollow ends of the artifact 100.

Figure 5:
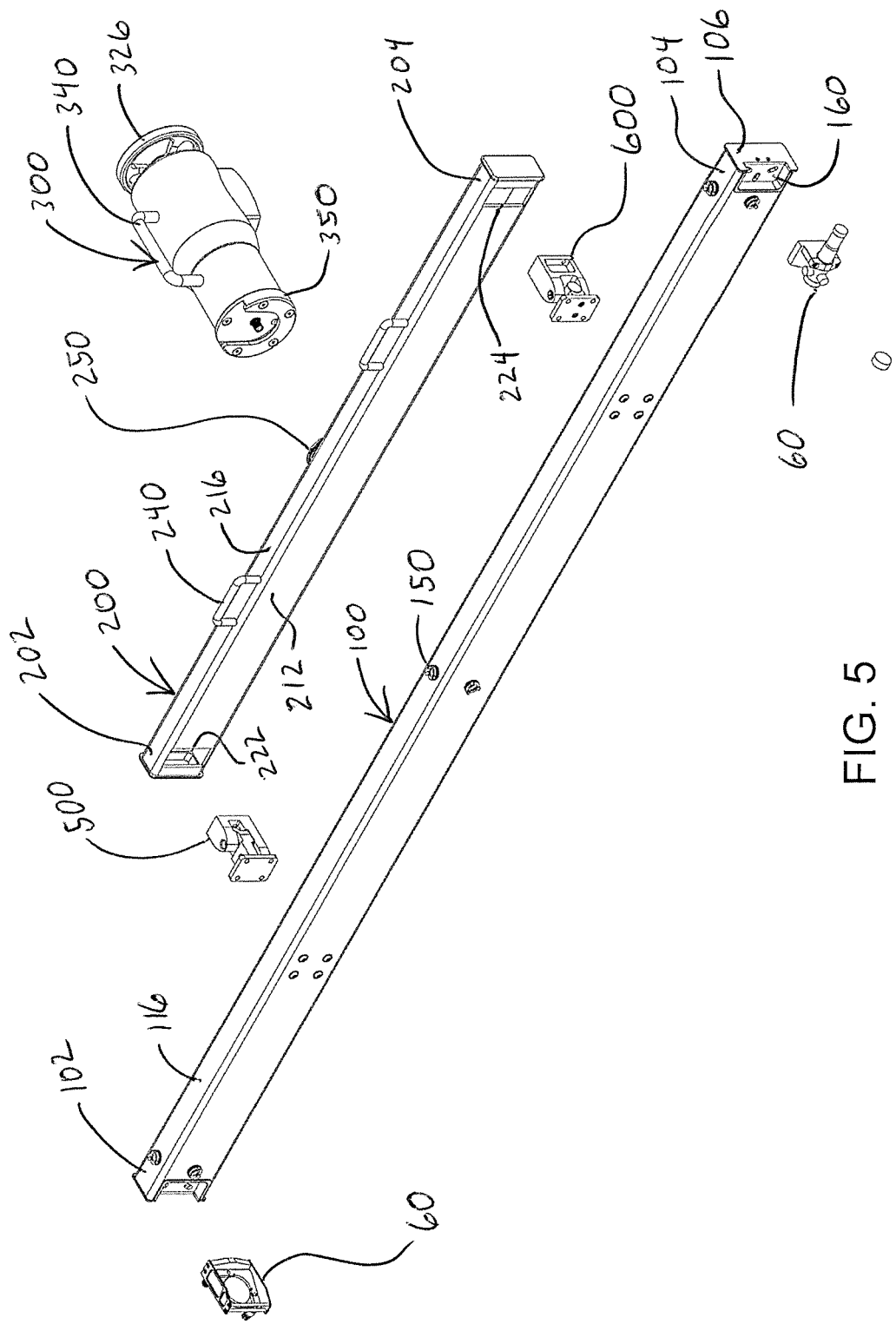
FIG. 5 is an exploded isometric view of the artifact and part of the support system of FIG. 1.

As shown in FIG. 5, a preferred embodiment of the artifact 100 includes a plurality of laser target holders 150 coupled at or near each end of the artifact. In some embodiments, at least one laser target holder is also coupled at or near a center point of the artifact 100. In the embodiment shown, some of the laser target holders are coupled to the front wall 112 of the artifact 100 while other laser target holders are coupled to the top wall 116 of the artifact so as to create a preferred laser target holder configuration. It will be appreciated that other embodiments of the artifact 100 include different laser target holder configurations.

Referring to FIGS. 5, 10, and 11A-14C, a preferred embodiment of the artifact 100 also includes at least one accessory tray 160. The accessory tray 160 includes a first interface 162 for securing the accessory tray 160 to the artifact 100 and a second interface 164 for selectively receiving one or more accessory 60. In some embodiments, the first interface 162 includes a groove and/or a raceway that is configured to slide over one or more edge of one or more wall of the artifact 100. In some such embodiments, the front wall 112 of the artifact 100 defines a profile 126 at each end of the artifact 100, each end profile 126 being configured to receive an accessory tray 160. More specifically, in some embodiments, each end profile 126 is configured so as to enable an accessory tray 160 to be slid into the end profile 126 by aligning a groove 162 of the accessory tray 160 with one or more edge of the end profile 126 and translating the accessory tray 160 so that the groove 162 of the accessory tray 160 receives the edges of the end profile 126. In some such embodiments, an end cap 106 prevents the accessory tray 160 from sliding out of the end profile 126, thereby securing the accessory tray 160 in place relative to the artifact 100.

The second interface 164 of the accessory tray 160 is configured to selectively receive an accessory 60. In some embodiments, one or more accessory includes an alignment mirror 62, an alignment target 64, an alignment laser 66, and/or some other alignment feature. In other embodiments, the second interface 164 includes three indentations defined by an interface panel 166 of the accessory tray 160. In some such embodiments, each indentation is oval in shape and the indentations are oriented relative to each other so as to form a Y-pattern. In some such embodiments, the accessory 60 includes three corresponding spheres 70 that are configured to be simultaneously received by the three indentations 164 so as to position the accessory 60 relative to the accessory tray, thereby positioning the accessory 60 relative to the artifact 100. In some such embodiments, the spheres 70 and the interface panel 166 include complementary magnetic and/or metallic properties so that the accessory 60 is selectively magnetically secured to the accessory tray 160.

In a preferred embodiment, an accessory tray 160 is secured to each end of the artifact 100. In some embodiments, the accessories 60 are equally weighted such that when an accessory 60 is selectively coupled to each accessory tray 160, the accessories 60 are positioned symmetrically relative to a support system 20 of the present invention so as to reduce and/or negate the effects on the artifact 100.

As shown in FIG. 5, the support system 20 includes a support beam 200. In some embodiments, the support beam 200 includes opposed front 212 and rear 214 walls extending between first 202 and second 204 ends of the support beam 200 and opposed top 216 and bottom 218 walls extending between respective top and bottom edges of the front 212 and rear 214 walls so as to define an interior area 210. In other embodiments, the support beam 200 includes end caps 206 coupled to each end of the support beam 200 so as to cap the hollow ends of the support beam 200.

As shown in FIGS. 9A-9C, the artifact 100 is selectively coupled to the support beam 200 by way of a first 500 and second 600 kinematic mount. The first kinematic mount 500 prevents the artifact 100 from rotating about a longitudinal axis of the artifact 100 and the second kinematic mount 600 prevents the artifact from rotating about the first kinematic mount 500. Additionally, the first kinematic mount 500 prevents the artifact from translating while the second kinematic mount 600 allows for differential thermal expansion and contraction of the support beam 200 relative to the artifact 100 without stretching, compressing, twisting, and/or bending the artifact 100. In such an embodiment, the first 500 and second 600 kinematic mounts, combined, approximately represent a Kelvin Clamp.

In a traditional Kelvin Clamp, three traditional interfaces produce six constraints. A first traditional interface includes a first primary sphere and a cone that is configured to receive the first primary sphere so as to produce translational constraints in all three transitional degrees of freedom. A second traditional interface includes one point of contact between a second primary sphere and a first surface so as to create a first rotational constraint. Finally, a third traditional interface includes two points of contact between a third primary sphere and a second and third surface so as to produce two additional rotational constraints. The second and third surfaces are positioned relative to each other so as to create a "vee" shape.

As shown in FIGS. 8A-8F, the first kinematic mount 500 is movable between an assembled configuration and a disassembled configuration and includes a first portion 510 having first 512 and second 514 primary spheres and a second portion 520 having three auxiliary spheres 522 and a first surface 524. In the disassembled configuration, the first 510 and second 520 portions are displaced from each other. In the assembled configuration, the first primary sphere 512 of the first portion 510 nests against each of the three auxiliary spheres 522 of the second portion 520 and the second primary sphere 514 of the first portion 510 nests against the first surface 524 of the second portion 520. In this way, when the first kinematic mount 500 is in the assembled configuration, the first 510 and second 520 portions of the first kinematic mount 500 functionally represent a first and second traditional interface of a Kelvin Clamp, such that the first kinematic clamp 500 is capable of constraining the artifact 100 in four degrees of freedom relative to the support beam 200.

In some embodiments, the center point of the first primary sphere 512 and the point of contact between the second primary sphere 514 and the first surface 524 define a pitch axis when the first kinematic mount 500 is in the assembled configuration. In other embodiments, a line perpendicular to the first surface and extending through the center of the first primary sphere 512 defines a yaw axis when the first kinematic mount 500 is in the assembled configuration.

In a preferred embodiment, the first kinematic mount 500 further includes a first pressure point located at the point of contact between a first pressure applicator 526 of the second portion 520 and a first pressure surface 516 of the first portion 510. In some such embodiments, applying pressure at the first pressure point biases the first kinematic mount 500 towards the assembled configuration, thereby enabling the first kinematic mount 500 to restrain the artifact 100 in four degrees of freedom regardless of the orientation of the artifact. In other such embodiments, the center point of the first sphere, the pressure point, and the point of contact between the second sphere and the first surface define a pitch axis when the first kinematic mount 500 is in the assembled configuration.

As shown in FIGS. 7A-7E, the second kinematic mount 600 is movable between an assembled configuration and a disassembled configuration and includes a first portion 610 having a first cylinder 612 and a second portion 620 having two auxiliary spheres 622. In the disassembled configuration, the first 610 and second 620 portions are displaced from each other. In the assembled configuration, the first cylinder 612 of the first portion 610 nests against each of the auxiliary spheres 622 of the second portion 620. In this way, when the second kinematic mount 600 is in the assembled configuration, the first 610 and second 620 portions of the second kinematic mount 600 functionally represent a third traditional interface of a Kelvin Clamp with the first cylinder 612 functionally replacing the traditional structure of a third sphere and the two auxiliary spheres 622 functionally replacing the traditional structure of a second and third surface positioned in a "vee" shape.

The second kinematic mount 600 includes a second pressure point located at the point of contact between a second pressure applicator 626 of the second portion 620 and the first cylinder 612 of the first portion 610. In some embodiments, applying pressure at the second pressure point biases the second kinematic mount 600 towards the assembled configuration regardless of the orientation of the second kinematic mount 600. Contact points between the first cylinder 612 and each of the two auxiliary spheres 622 define two tangent lines and a first convergence point. In some embodiments, the first convergence point is coincidental with the longitudinal axis of the first cylinder 612. In other embodiments, a tangent line passing through the second pressure point also passes through the first convergence point when the second kinematic mount 600 is in the assembled configuration.

In a preferred embodiment, the first 500 and second 600 kinematic clamps are symmetrically biased towards respective first 102 and second 104 ends of the artifact 100 such that, together, they are capable of constraining the artifact 100 in six degrees of freedom relative to the support beam 200. For instance, in some embodiments, the second kinematic mount 600 is configured to restrain the artifact 100 in two degrees of freedom, with the first constraint preventing the artifact 100 from rotating about the pitch axis of the first kinematic mount 500 and the second constraint preventing the artifact 100 from rotating about the yaw axis of the first kinematic mount 500.

The kinematic mounts are configured to constrain the artifact 100 in six degrees of freedom while minimizing or eliminating additional constraints. In some embodiments, the second kinematic mount 600 is configured to allow the first cylinder 612 to translate along a longitudinal axis of the first cylinder 612 so as to prevent the kinematic mounts from inducing or preventing elongation of the artifact 100. In other embodiments, the longitudinal axis of the first cylinder 612 of the second kinematic mount 600 defines a roll axis so as to prevent the kinematic mounts from inducing and/or correcting a twist in the artifact. In still other embodiments, the longitudinal axis of the first cylinder 612 of the second kinematic mount 600 is coincidental with the center point of the first primary sphere 512 of first kinematic mount 500. In yet other embodiments, the longitudinal axis of the first cylinder 612 of the second kinematic mount 600 is coincidental with the longitudinal axis of the artifact 100.

In a preferred embodiment, as shown in FIGS. 9A-9D, the rear wall 114 of the artifact 100 defines first 122 and second 124 apertures that are configured to receive respective first 500 and second 600 kinematic mounts. In some embodiments, respective first portions 510, 610 of the first 500 and second 600 kinematic mounts are positioned at least partially within the interior area 110 of the artifact 100 and respective second portions 520, 620 of the first 500 and second 600 kinematic mounts are positioned at least partially outside of the interior area 110 of the artifact 100 such that when the kinematic mounts are coupled to the artifact 100, each mount extends through its respective aperture. In other embodiments, each first portion 510, 610 of the first 500 and second 600 kinematic mounts includes a first mounting plate 518, 618 for selectively mounting respective kinematic mounts to the front wall 112 of the artifact 100.

In some embodiments, the front wall 212 of the support beam 200 defines first 222 and second 224 apertures that correspond with respective first 212 and second 214 apertures of the artifact. Each aperture 222, 224 is configured to receive respective first 500 and second 600 kinematic mounts. In some embodiments, respective second portions 520, 620 of the first 500 and second 600 kinematic mounts are positioned at least partially within the interior area 210 of the support beam 200 and respective first portions 510, 610 of the first 500 and second 600 kinematic mounts are positioned at least partially outside of the interior area 210 of the support beam 200 such that when the kinematic mounts are coupled to the support beam 200, each mount extends through its respective aperture. In other embodiments, each second portion 520, 620 of the first 500 and second 600 kinematic mounts includes a second mounting plate 528, 628 for selectively mounting respective kinematic mounts to the rear wall 214 of the support beam 200.

In a preferred embodiment, as shown in FIGS. 9A-9D, the artifact 100 is secured to the support beam 200 by way of the first 500 and second 600 kinematic mounts. In some embodiments, the mounts are symmetrically biased towards respective first 102, 202 and second 104, 204 ends of the artifact 100 and the support beam 200 so as to equally balance the artifact 100 and the support beam 200 about a center point of the support beam 200. In some such embodiments, the kinematic mounts extend into the interior areas 110, 210 of the artifact 100 and the support beam 200 such that the artifact 100 and the support beam 200 are capable of being positioned relatively adjacent to each other. In this way, the distance between the rear wall 214 of the support beam 200 and the center of gravity of the artifact 100 is reduced and/or minimized.

In some embodiments of the support system 20, the support beam 200 includes one or more handle 240 that is configured to enable a user to lift and/or otherwise move the artifact without requiring the user to touch the artifact. In this way, the artifact may be moved without introducing heat energy from a user's hand into the artifact. In other embodiments, the support system 20 further includes a positioner 300 and a base member 22 for supporting the positioner 300 above the ground. In some such embodiments, the positioner 300 includes a handle 340. In other such embodiments, the support beam 200 is rotatably coupled to the positioner 300 such that by rotating the support beam 200 relative to the positioner 300, the artifact 100 can be moved between a horizontal configuration, an angled configuration, and a vertical configuration. In other such embodiments, the support beam 200 is selectively secured to the positioner 300 such that the artifact is prevented from moving between configurations. In this way, the artifact can be moved between configurations and/or held in a particular configuration without requiring a user to touch the artifact 100.

Figure 20:
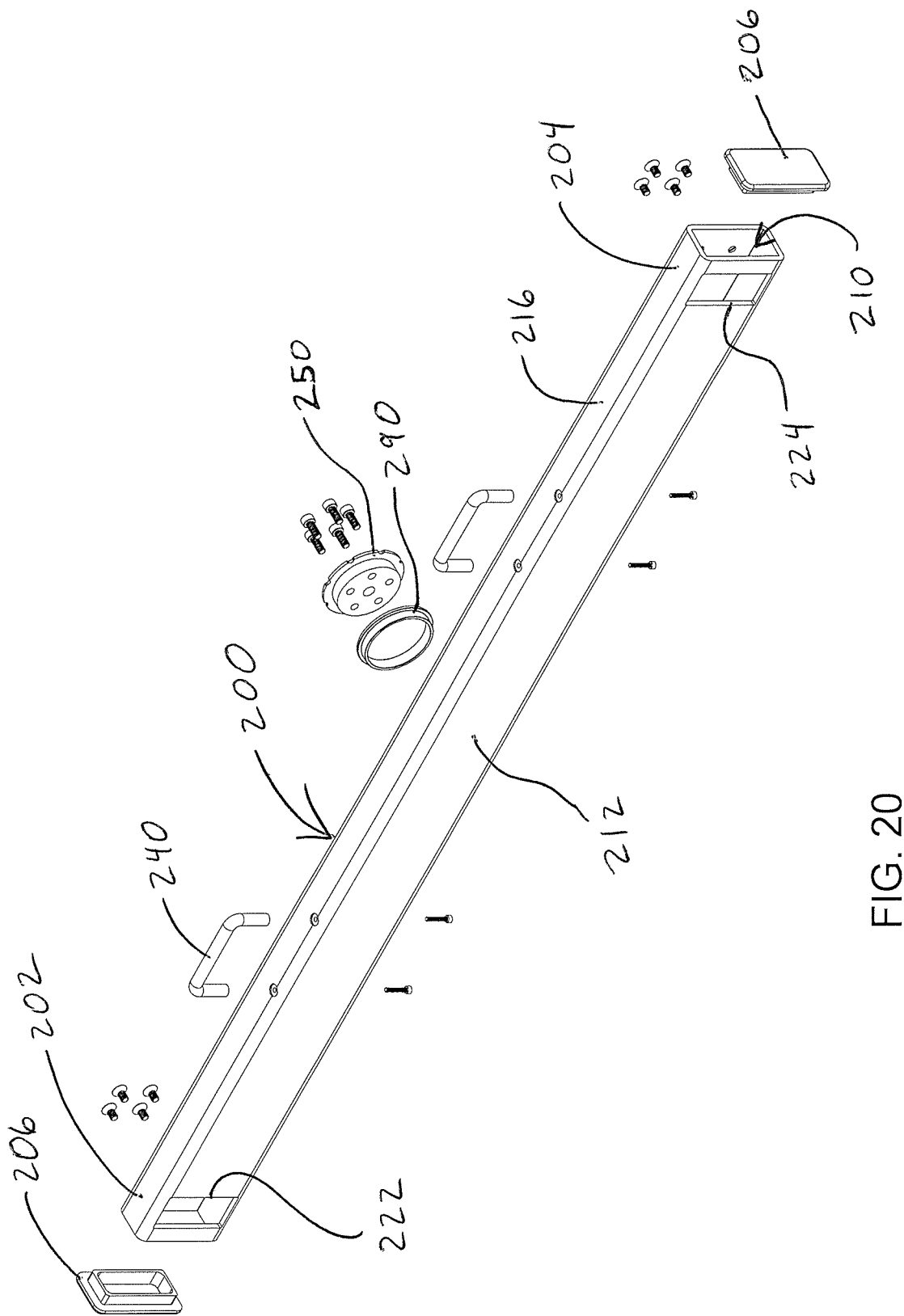
FIG. 20 is an exploded perspective view of a support beam and a ring brake of the present invention.

In a preferred embodiment, as shown in FIG. 20, the support system 20 further includes a ring brake 250 and a yoke 350 that is configured to receive the ring brake 250. In some embodiments, the ring brake 250 includes a center web 260 and a ring flange 270 extending from an exterior surface 266 of the center web 260. In some such embodiments, the exterior surface 266 of the center web 260 defines a first diameter and an exterior surface 276 of the ring flange 270 defines a larger second diameter. In other embodiments, the center web 260 defines a center aperture 268.

Figure 6:
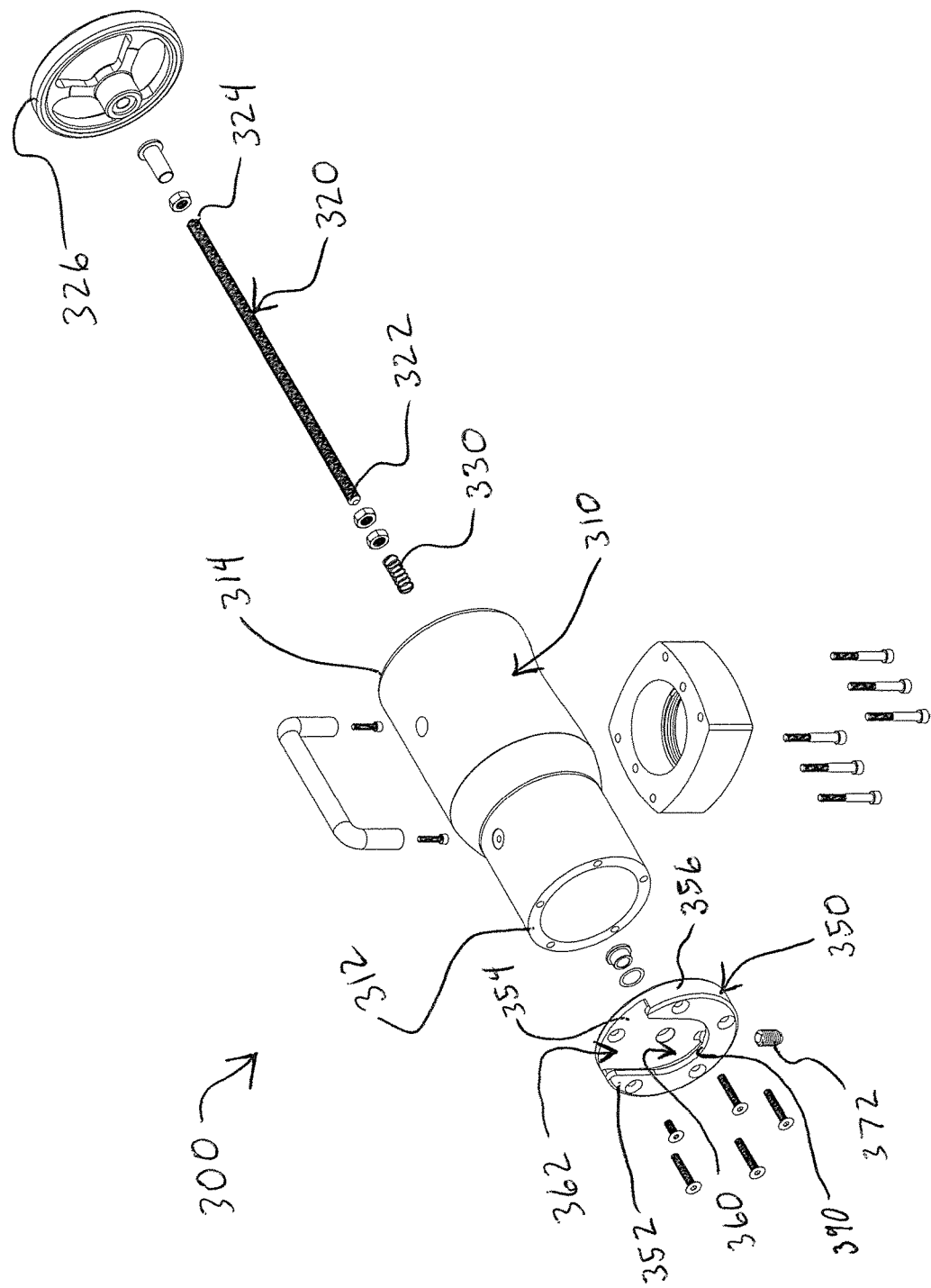
FIG. 6 is an exploded isometric view of a positioner of the present invention.
Figure 7E:
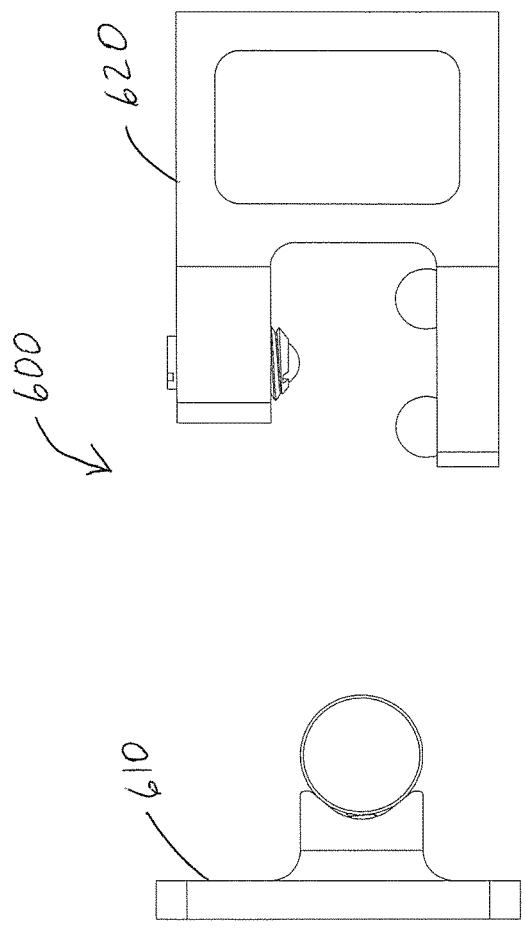
FIG. 7E is a side view of the second kinematic mount of FIG. 7A, the second kinematic mount being in a disassembled configuration.
Figure 7D:
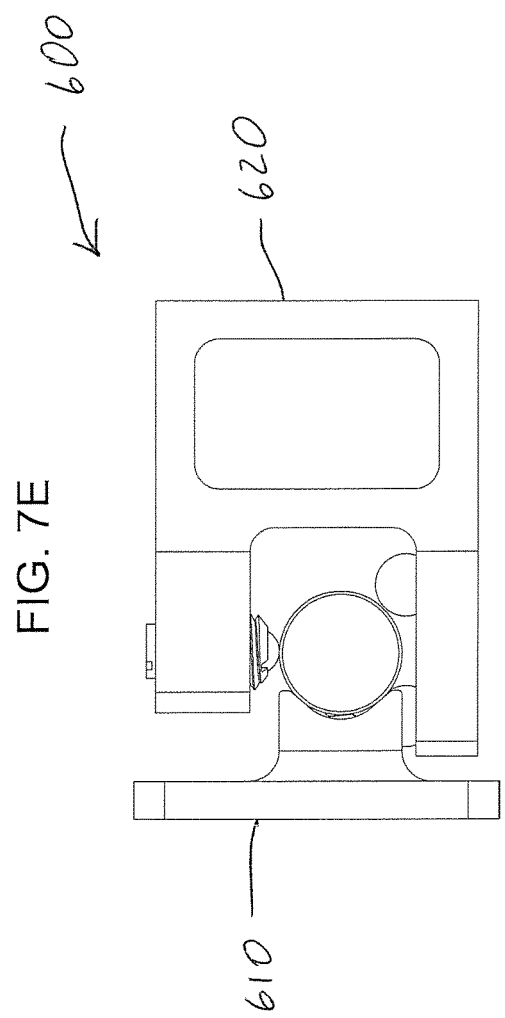
FIG. 7D is a side view of the second kinematic mount of FIG. 7A, the second kinematic mount being in an assembled configuration.
Figure 10:
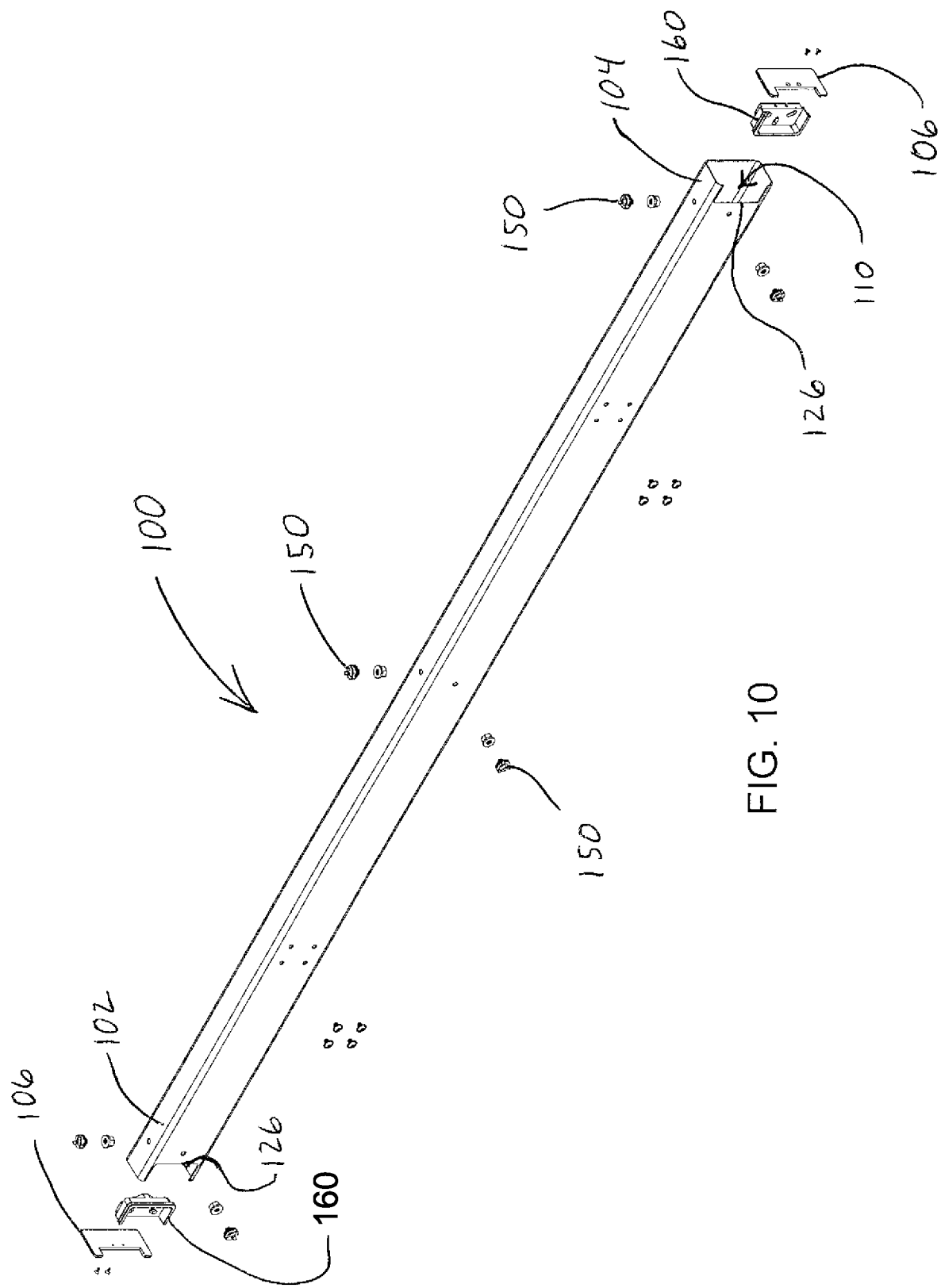
FIG. 10 is an exploded isometric view of the artifact of FIG. 1.
Figures 18A, 18B:
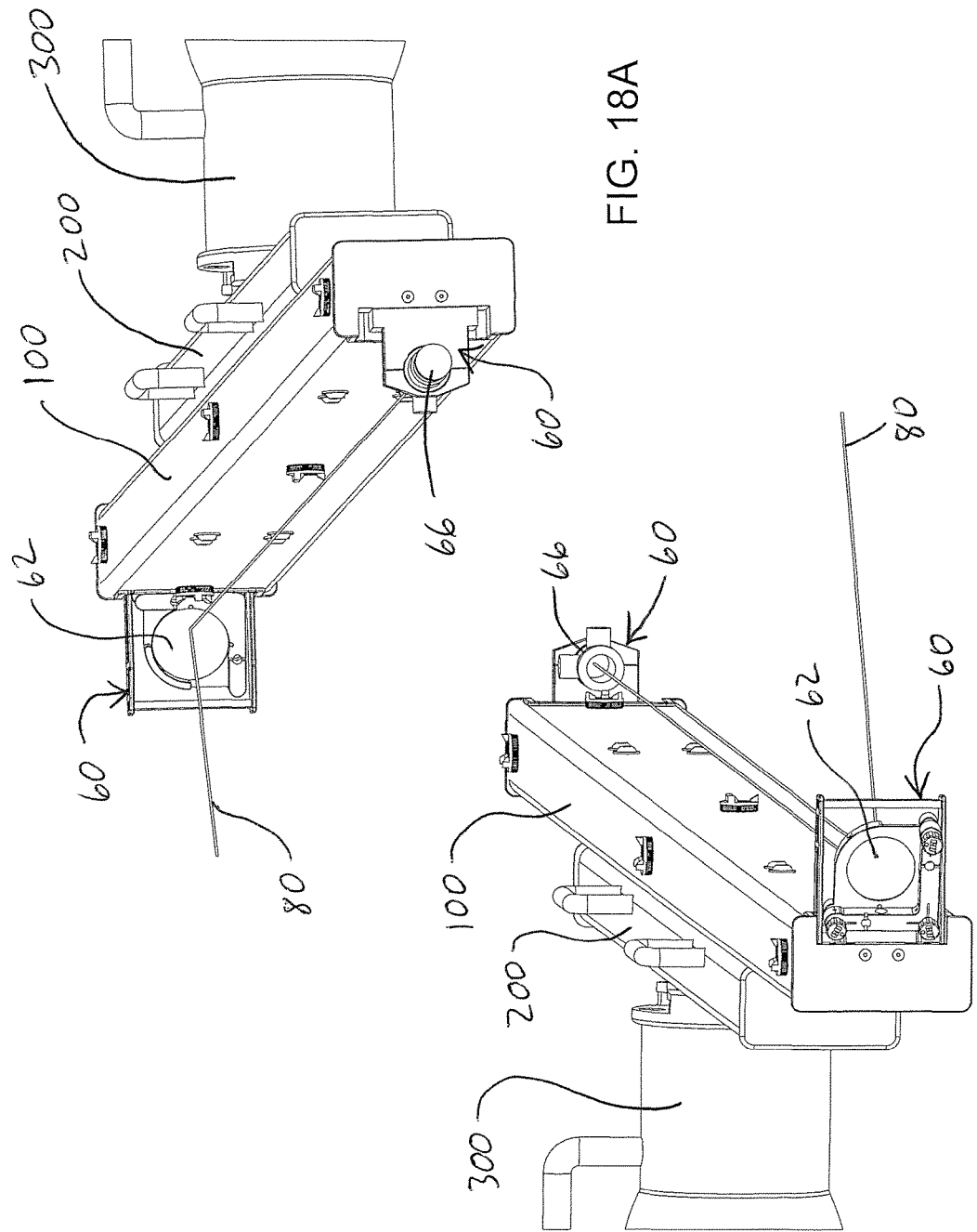
FIG. 18A is a perspective view of the artifact of FIG. 13A showing a beam of light being directed from the alignment laser towards the alignment mirror and reflecting off of the alignment mirror away from the artifact.
FIG. 18B is a perspective view of the artifact of FIG. 18A, shown at a different angle as FIG. 18A.

In a preferred embodiment, as shown in FIG. 6, the yoke 350 includes opposed front 352 and rear 354 panels and a side panel 356 extending between the front 352 and rear 354 panels so as to define an interior area 360 that is configured to receive at least part of the ring brake 250. In some embodiments, the interior area 360 of the yoke 350 is configured to receive the ring flange 270 of the ring brake 250 and the front panel 352 of the yoke 350 is configured to allow the center web 260 of the ring brake 250 to extend through the front panel 352 of the yoke 350. In some such embodiments, the front 352 and side 356 panels of the yoke 350 define a top opening 362 such that the ring brake 250 can be selectively received by the yoke 350 by sliding the ring brake 250 through the top opening 362 of the yoke 350 and into the interior area 360 of the yoke 350.

In a preferred embodiment, the front panel 352 of the yoke 350 defines a curved bearing surface 390. In some embodiments, the bearing surface 390 of the yoke 350 is in communication with the exterior surface 266 of the ring brake 250 when the ring brake 250 is received by the yoke 350. In other embodiments, the ring brake 250 includes a bushing 290 having an interior surface 292 defining an inner diameter and an exterior surface 294 defining an outer diameter. The inner diameter is approximately the same diameter as the first diameter defined by the exterior surface 266 of the center web 260 and the outer diameter is larger than the inner diameter but smaller than the second diameter defined by the exterior surface 276 of the ring flange 270. In some such embodiments, the bushing 290 is configured to receive at least part of the center web 260 of the ring brake 250 such that the interior surface 292 of the bushing 290 is in communication with the exterior surface 266 of the center web 260. In some such embodiments, the bearing surface 390 of the yoke 350 is in communication with the exterior surface 394 of the bushing 290 when the ring brake 250 is received by the yoke 350.

Referring to FIGS. 5, 20, and 23B, the ring brake 250 is coupled to the rear wall 214 of the support beam 200 with a front surface 252 of the ring brake 250 contacting the rear wall 214 of the support beam 200 and the ring flange 270 being displaced from the support beam 200 so as to provide clearance for the front panel 352 of the yoke 350 to be positioned between the support beam 200 and the ring flange 270 of the ring brake 250 when the ring brake 250 is received by the yoke 350. In some embodiments, the ring brake 250 is positioned relative to the support beam 200 and/or the artifact 100 such that when the ring brake 250 rotates within the yoke 350, the support beam 200 and/or the artifact 100 rotates about a center point of the support beam 200 and/or the artifact 100.

Referring to FIGS. 5 and 23B, the yoke 350 is coupled to a front end 312 of a housing 310 of the positioner 300. In some embodiments, a proximal end 322 of a primary rod 320 extends through the rear panel 354 of the yoke 350 and couples to the ring brake 250 so as to selectively pull a rear surface 254 of the ring brake 250 into frictional contact with the rear panel 354 of the yoke 350 so as to secure the ring brake 250 to the yoke 350 and/or to orient the ring brake 250 relative to the yoke 350 and/or the positioner 300. In some such embodiments, the proximal end 322 of the primary rod 320 is configured to be received by the center aperture 268 of the ring brake 250. In other such embodiments, the rear surface 254 of the ring brake 250 is a raised surface so that tolerances of the rear surface 254 can be more tightly controlled and/or so that the ring brake 250 can more easily rotate when the rear surface 254 of the ring brake is not in frictional contact with the rear panel 354 of the yoke.

In some embodiments, the positioner 300 includes one or more spring member 330 that is configured to bias the primary rod 320 away from the ring brake 250 so that the ring brake 250 may be readily received by the yoke 350. In other embodiments, a distal end 324 of the primary rod 320 extends through a rear end 314 of the housing 310 so as to more easily allow a user to cause the primary rod 320 to engage or disengage with the ring brake 250. In some such embodiments, a hand wheel 326 or some other similar mechanism is coupled to the distal end 324 of the primary rod 320 so as to provide a user with a mechanical advantage when engaging or disengaging the primary rod 320 with the ring brake 250.

Figures 21A, 21B:
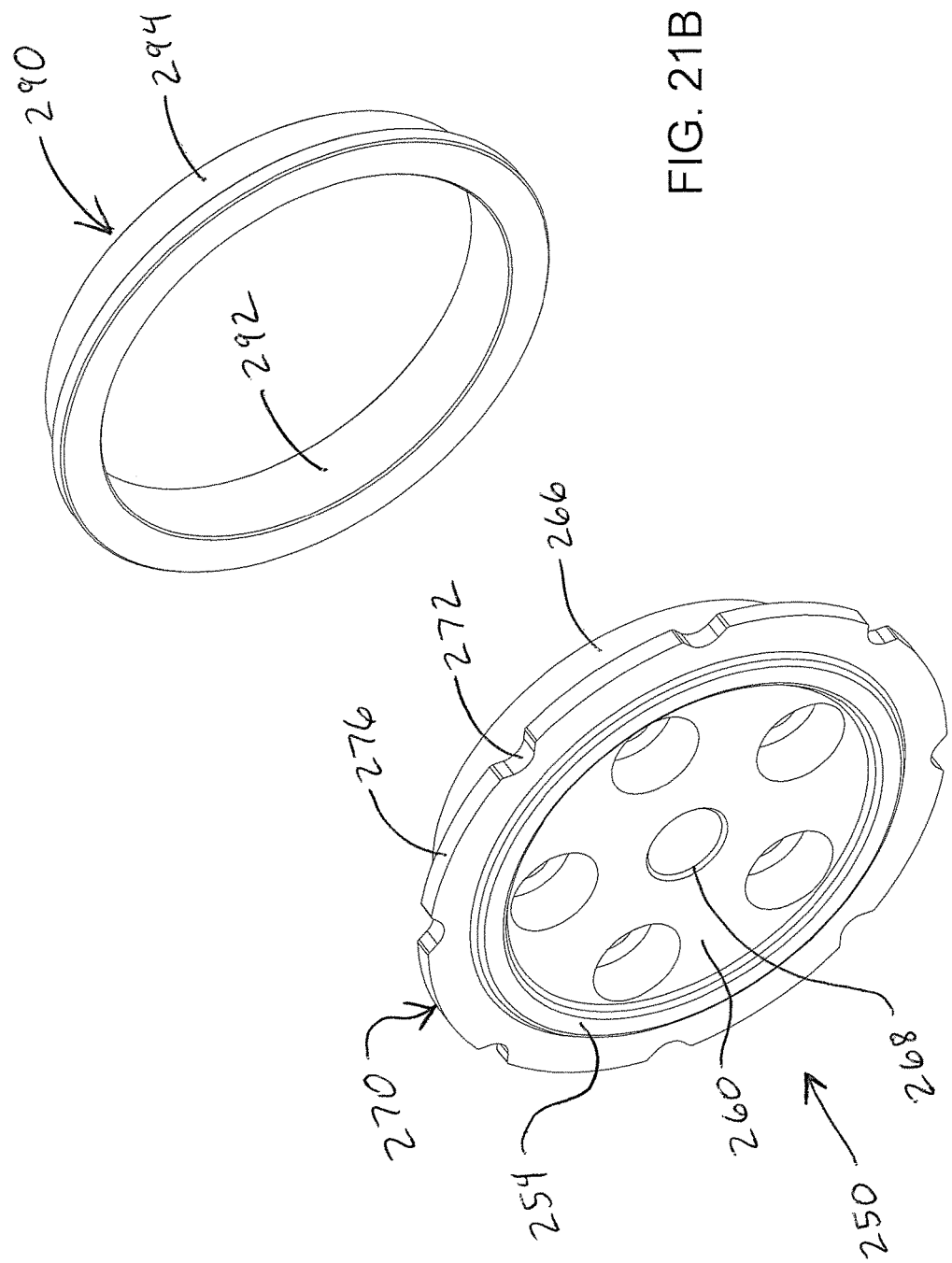
FIG. 21A is a perspective view of a ring brake of the present invention.
FIG. 21B is a perspective view of a bushing of the present invention.

Referring to FIG. 21A, the ring flange 270 of the ring brake 250 defines a plurality of locating features 272 for haptic feedback and positioning repeatability. In some embodiments, each locating feature 272 is one of a tab, an indentation, and/or an aperture. In other embodiments, the yoke includes a plunger 372 that is movable between an engaged configuration and a disengaged configuration. In the engaged configuration, the plunger 372 is in communication with at least one locating feature 272 such that the ring brake 250 is inhibited from rotating relative to the yoke 350. In the disengaged configuration, the plunger 372 is displaced from the locating feature 272 such that the ring brake 250 is allowed to rotate relative to the yoke 350. In some embodiments, the plunger is biased towards the engaged configuration.

The present invention also pertains to a method of calibrating a laser tracker. In some embodiments, the method includes removing one or more laser target 50 from an artifact 100 so as to enable a beam of light 80 to be directed through the virtual centers of the laser targets 50. Some such embodiments further include coupling an alignment mirror 62 to a first end 102 of the artifact 100 and coupling an alignment target 64 to an opposed second end 104 of the artifact 100. The alignment mirror 62 is adjustable so that a beam of light 80 directed onto the alignment mirror 62 can be manipulated to reflect the beam of light 80 towards the alignment target 64 through the virtual centers of the laser target 50. In some such embodiments, the alignment mirror 62 is adjustable relative to a reference point on the reflective surface of the alignment mirror 62 and the alignment target 64 includes a reference point that corresponds with the reference point of the alignment mirror 62 such that when the beam of light 80 is directed at the reference point of the alignment mirror 62 and the reflected beam of light 80 is directed at the reference point of the alignment target 64, the reflected beam of light 80 passes through the virtual centers of the laser targets 50.

In a preferred method, the artifact 100 is moved to a first position relative to a laser tracker and is oriented in a first configuration prior to performing a first test and/or taking a first set of measurements. In some embodiments, the artifact 100 is horizontal in the first configuration and the center of the artifact 100 is located directly in front of and at approximately the same height as a beam aperture 32 of the laser tracker 30 such that a beam of light 80 emitting from the laser tracker aperture that is directed towards the alignment mirror is approximately horizontal. In other embodiments, the artifact 100 is angled or vertical in the first configuration and/or in one or more other configurations. In still other embodiments, the center of the artifact 100 is not positioned directly in front of and/or is not positioned at approximately the same height as the beam aperture 32 of the laser tracker 30.

In some embodiments, the beam of light 80 is directed at a reference point on a reflective surface of the alignment mirror 62 and the alignment mirror 62 is adjusted so as to reflect the beam of light 80 towards a reference point of the alignment target 64. In some such embodiments, one or more of the reference points is an alignment point, such as a point at the intersection of two or more lines. A laser target 50 is then coupled to the artifact 100 at or near the second end 104 of the artifact 100 and the distance from the laser tracker 30 to the center of the laser target 50 by way of the alignment mirror 62 is measured. The laser target 50 is then moved to a position at or near the first end 102 of the artifact and a similar measurement is taken. In this way, the reference length of the artifact 100 can be quickly and easily obtained using the more accurate ranging system of the laser tracker 30. In some embodiments, the direct distance from the laser tracker 30 and the center of the laser target 50 is also measured so as to exercise one or more error source within the tracker without moving the artifact from the position and orientation in which the reference length of the artifact 100 is established. In other embodiments, the artifact 100 is repositioned and/or reoriented so as to exercise one or more other error source within the tracker. In some such embodiments, a new reference length is established for the artifact 100 after the artifact 100 has been repositioned and/or reoriented.

In other embodiments, an alignment mirror 62 is selectively coupled to a first end 102 of an artifact and an alignment laser 66 is selectively coupled to an opposed second end 104 of the artifact 100. The alignment laser 66 and the alignment mirror 62 are positioned such that the alignment laser projects a beam of light across the length of the artifact through the virtual centers of the target spheres 50 onto a reflective surface of the alignment mirror 62. The alignment mirror 62 is then steered so that the alignment beam is collinear with the laser tracker beam and coincident with the laser tracker aperture 32. In this way, the alignment mirror 62 and the alignment laser 66 are capable of being used to quickly and easily align the laser tracker beam with the virtual centers of the target spheres 50.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A laser tracker calibration system comprising:
   an artifact;
   a first kinematic mount selectively coupled to said artifact at a first location;
   a second kinematic mount selectively coupled to said artifact at a second location,
   wherein said first and second kinematic mounts are coupled to a rigid support structure so as to hold said artifact relative to a laser tracker during calibration of the laser tracker; and
   a positioner rotatably coupled to said rigid support structure,
   wherein said first kinematic mount prevents said artifact from rotating about a longitudinal axis of said artifact, and
   wherein said second kinematic mount prevents said artifact from rotating about said first kinematic mount and allows for differential thermal expansion and contraction of said rigid support structure relative to said artifact without stretching, compressing, twisting, and/or bending said artifact.

2. The laser tracker calibration system of claim 1, wherein said first and second kinematic mounts are configured to constrain the artifact in six degrees of freedom so as to minimize or eliminate adverse effects associated with over-constraining the artifact.

3. The laser tracker calibration system of claim 1, further comprising accessory trays coupled to opposed first and second ends of said artifact, each accessory tray being configured to receive one or more accessory.

4. The laser tracker calibration system of claim 3, wherein one of said accessories is an alignment mirror selectively coupled to said accessory tray at said first end of said artifact and another of said accessories is an alignment target selectively coupled to said accessory tray at said second end of said artifact such that a beam of light reflected off of the alignment mirror can be directed towards the alignment target.

5. The laser tracker calibration system of claim 3, wherein said first and second ends of said artifact each define an end profile that is configured to receive an accessory tray, wherein said accessory trays include a first interface feature for securing said accessory trays to said end profiles of said artifact, and wherein said accessory trays include a second interface feature that is configured to selectively receive an accessory.

6. A laser tracker calibration system comprising:
   an artifact;
   a first kinematic mount selectively coupled to said artifact at a first location;
   a second kinematic mount selectively coupled to said artifact at a second location, wherein said first and second kinematic mounts are coupled to a rigid support structure so as to hold said artifact relative to a laser tracker during calibration of the laser tracker; and
   a positioner rotatably coupled to said rigid support structure,
   wherein said artifact includes opposed front and rear walls extending between opposed first and second ends of said artifact and opposed top and bottom walls extending between respective top and bottom edges of said front and rear walls so as to define an interior area, wherein said rear wall of said artifact defines first and second apertures that are configured to receive respective first and second kinematic mounts, and wherein said first and second kinematic mounts extend through respective first and second apertures of said artifact such that said first and second kinematic mounts extend into the interior areas of said artifact so as to enable said artifact to be positioned more closely to the rigid support structure.

7. The laser tracker calibration system of claim 6, wherein said first and second kinematic mounts are configured to constrain the artifact in six degrees of freedom so as to minimize or eliminate adverse effects associated with over-constraining the artifact.

8. The laser tracker calibration system of claim 6, further comprising accessory trays coupled to opposed first and second ends of said artifact, each accessory tray being configured to receive one or more accessory.

9. The laser tracker calibration system of claim 8, wherein one of said accessories is an alignment mirror selectively coupled to said accessory tray at said first end of said artifact and another of said accessories is an alignment target selectively coupled to said accessory tray at said second end of said artifact such that a beam of light reflected off of the alignment mirror can be directed towards the alignment target.

10. The laser tracker calibration system of claim 8, wherein said first and second ends of said artifact each define an end profile that is configured to receive an accessory tray, wherein said accessory trays include a first interface feature for securing said accessory trays to said end profiles of said artifact, and wherein said accessory trays include a second interface feature that is configured to selectively receive an accessory.

11. A method of calibrating a laser tracker, the method comprising:
utilizing a first laser target to obtain a first measurement that is associated with a position of a first end of an artifact when the artifact is in a first orientation;
utilizing an alignment mirror and one of the first laser target or a second laser target to obtain a second measurement that is associated with a position of a second end of the artifact when the artifact is in the first orientation;
comparing the second measurement with the first measurement so as to determine a first reference length of the artifact;
utilizing the alignment mirror to obtain the first measurement;
orienting the artifact in a second configuration;
repeating the utilizing and comparing steps so as to determine a second measured reference length of the artifact; and
comparing the second measured reference length with the first measured reference length.

12. The method of claim 11, further comprising configuring the alignment mirror prior to obtaining the second measurement, such configuring step including:
directing a beam of light towards a reflective surface of the alignment mirror so that the beam of light reflects off of the reflective surface of the alignment mirror;
adjusting the alignment mirror so as to direct the reflected beam of light towards the second end of the artifact.

13. The method of claim 12, wherein the adjustment step causes the reflected beam of light to be directed towards an alignment target.

14. The method of claim 11, wherein the artifact is held in position by a support system that includes one or more feature for assisting a user in quickly and easily moving the artifact from the first configuration to the second configuration.

15. A method of calibrating a laser tracker, the method comprising:
utilizing a first laser target to obtain a first measurement that is associated with a position of a first end of an artifact when the artifact is in a first orientation;
utilizing an alignment mirror and one of the first laser target or a second laser target to obtain a second measurement that is associated with a position of a second end of the artifact when the artifact is in the first orientation;
comparing the second measurement with the first measurement so as to determine a first reference length of the artifact;
utilizing the alignment mirror to obtain the first measurement;
obtaining a third measurement that is associated with the position of the first end of the artifact;
obtaining a fourth measurement that is associated with the position of the second end of the artifact;
comparing the fourth measurement with the second measurement so as to determine a first measured length of the artifact; and
comparing the first reference length of the artifact with the first measured length of the artifact,
wherein the third and fourth measurements are obtained without utilizing the alignment mirror.

16. The method of claim 15, further comprising configuring the alignment mirror prior to obtaining the second measurement, such configuring step including:
directing a beam of light towards a reflective surface of the alignment mirror so that the beam of light reflects off of the reflective surface of the alignment mirror;
adjusting the alignment mirror so as to direct the reflected beam of light towards the second end of the artifact.

17. The method of claim 16, wherein the adjustment step causes the reflected beam of light to be directed towards an alignment target.

18. A method of calibrating a laser tracker, the method comprising:
positioning an artifact relative to the laser tracker, the artifact having an alignment mirror coupled to a first end of the artifact and an alignment laser coupled to a second end of the artifact;
orienting the artifact in a first configuration;
directing a beam of light from the alignment laser towards a reflective surface of the alignment mirror so that the beam of light reflects off of the reflective surface of the alignment mirror;
adjusting the alignment mirror so as to direct the reflected beam of light at an aperture of the laser tracker;
utilizing a first laser target and alignment mirror to obtain a first measurement that is associated with a position of the first end of the artifact;
utilizing the alignment mirror and one of the first laser target or a second laser target to obtain a second measurement that is associated with a position of the second end of the artifact;
comparing the second measurement with the first measurement so as to determine a first reference length of the artifact
orienting the artifact in a second configuration;

repeating the directing, adjusting, utilizing, and comparing steps so as to determine a second measured reference length of the artifact; and comparing the second measured reference length with the first measured reference length.

19. The method of claim 18, wherein the artifact is held in position by a support system that includes one or more feature for assisting a user in quickly and easily moving the artifact from the first configuration to the second configuration.

20. The method of claim 18, further comprising:
obtaining a third measurement that is associated with the position of the first end of the artifact;
obtaining a fourth measurement that is associated with the position of the second end of the artifact;
comparing the fourth measurement with the second measurement so as to determine a first measured length of the artifact; and
comparing the first reference length of the artifact with the first measured length of the artifact,
wherein the third and fourth measurements are obtained without utilizing the alignment mirror.

* * * * *